US012693585B2

(12) United States Patent
Ito et al.

(10) Patent No.: US 12,693,585 B2
(45) Date of Patent: Jul. 28, 2026

(54) PROJECTOR HAVING LIGHT COMBINER STRUCTURE FOR REDUCTION OF EMI NOISE

(71) Applicant: SEIKO EPSON CORPORATION, Tokyo (JP)

(72) Inventors: Masaaki Ito, Ina (JP); Masayuki Suyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 583 days.

(21) Appl. No.: 18/165,405

(22) Filed: Feb. 7, 2023

(65) Prior Publication Data

US 2023/0251557 A1 Aug. 10, 2023

(30) Foreign Application Priority Data

Feb. 7, 2022 (JP) ................................ 2022-017499

(51) Int. Cl.
  *G03B 21/14* (2006.01)
  *G03B 21/16* (2006.01)
(52) U.S. Cl.
  CPC ........... *G03B 21/145* (2013.01); *G03B 21/16* (2013.01)
(58) Field of Classification Search
  CPC ............................. G03B 21/16; G03B 21/145
  See application file for complete search history.

(56) References Cited

U.S. PATENT DOCUMENTS

| | | | | | |
|---|---|---|---|---|---|
| 6,056,407 A | * | 5/2000 | Iinuma | ................... | H04N 9/317 |
| | | | | | 353/122 |
| 6,322,217 B1 | * | 11/2001 | Fujimori | .............. | G03B 21/145 |
| | | | | | 353/34 |
| 6,565,213 B1 | * | 5/2003 | Yamaguchi | .......... | H04N 9/3105 |
| | | | | | 348/E5.143 |
| 6,595,645 B2 | * | 7/2003 | Shiraishi | .............. | H04N 9/3141 |
| | | | | | 353/57 |
| 6,981,772 B2 | * | 1/2006 | Kim | ..................... | G03B 21/145 |
| | | | | | 348/E9.027 |
| 7,055,970 B2 | * | 6/2006 | Kitabayashi | ......... | G03B 21/145 |
| | | | | | 353/100 |
| 2004/0012982 A1 | * | 1/2004 | Kim | ..................... | H04N 9/3105 |
| | | | | | 362/558 |
| 2004/0165152 A1 | * | 8/2004 | Ito | .......................... | G03B 21/16 |
| | | | | | 353/30 |

(Continued)

FOREIGN PATENT DOCUMENTS

JP 2004-354795 A 12/2004
JP 2013-015697 A 1/2013

*Primary Examiner* — Bao-Luan Q Le
(74) *Attorney, Agent, or Firm* — Dority & Manning, P.A.

(57) ABSTRACT

A projector includes a first light modulator configured to emit first image light beam, a second light modulator configured to emit second image light beam, a prism configured to combine the first image light beam and the second image light beam with each other, a first metal member configured to couple the first light modulator and the prism to each other, a lens configured to project light beam combined by the prism, a second metal member configured to support the lens, and a third metal member configured to couple the prism and the second metal member to each other. An air layer is disposed in a facing area where the first metal member and the prism face each other.

7 Claims, 11 Drawing Sheets

(56)  References Cited

U.S. PATENT DOCUMENTS

| | | | |
|---|---|---|---|
| 2005/0105063 A1* | 5/2005 | Kitabayashi | G02B 27/62 |
| | | | 348/E9.027 |
| 2005/0179876 A1* | 8/2005 | Iinuma | G03B 21/16 |
| | | | 353/60 |
| 2006/0209266 A1* | 9/2006 | Utsunomiya | G03B 21/16 |
| | | | 353/54 |

* cited by examiner

PROJECTOR HAVING LIGHT COMBINER STRUCTURE FOR REDUCTION OF EMI NOISE

The present application is based on, and claims priority from JP Application Serial Number 2022-017499, filed Feb. 7, 2022, the disclosure of which is hereby incorporated by reference herein in its entirety.

BACKGROUND

1. Technical Field

The present disclosure relates to a projector.

2. Related Art

In recent years, as a projector installed in a facility including a main conference room, a hall, and an event space, there is used a high-luminance projector provided with a laser source. In the high-luminance projector, light modulation devices including liquid crystal panels and light valves for generating image light beams of respective three primary colors, and a prism for combining the image light beams emitted from these light modulation devices with each other are held by a metal member difficult to be deformed by heat. By holding the light modulation devices and the prism with the metal member, a displacement in relative position of the prism to the light modulation devices caused by the heat generated from an element including the laser source and a power supply is suppressed.

For example, in a projection type display device disclosed in JP-A-2004-354795 (Document 1), reflective light valves for generating modulated light beam of the three primary colors are fitted in an opening provided to a first attachment member as a metal plate member. The first attachment member in which the reflective light valves are fitted is bonded to the prism with an adhesive via a second attachment member.

However, in the projector including the projection type display device disclosed in Document 1, when an EMI (Electro Magnetic Interference) noise is generated from the light modulation devices including the reflective light valves or an integrated circuit coupled to the light modulation devices, the EMI noise propagates to the prism from the first attachment member and the second attachment member. Since the prism is formed of glass having predetermined permittivity, the prism functions as a dielectric body as a capacitor with respect to the EMI noise. The EMI noise propagated through the prism is emitted to the outside of the projector from the metal member for supporting the prism and a metal member coupled to that member. The EMI noise emitted to the outside of the projector has an influence on an action of electronic equipment located outside the projector.

SUMMARY

A projector according to the present disclosure includes a first light modulator configured to emit first image light beam, a second light modulator configured to emit second image light beam, a prism configured to combine the first image light beam and the second image light beam with each other, a first metal member configured to couple the first light modulator and the prism to each other, a lens configured to project light beam combined by the prism, a second metal member configured to support the lens, and a third metal member configured to couple the prism and the second metal member to each other. An air layer is disposed in a facing area where the first metal member and the prism face each other.

DESCRIPTION OF EXEMPLARY EMBODIMENTS

First Embodiment

Figure 1:
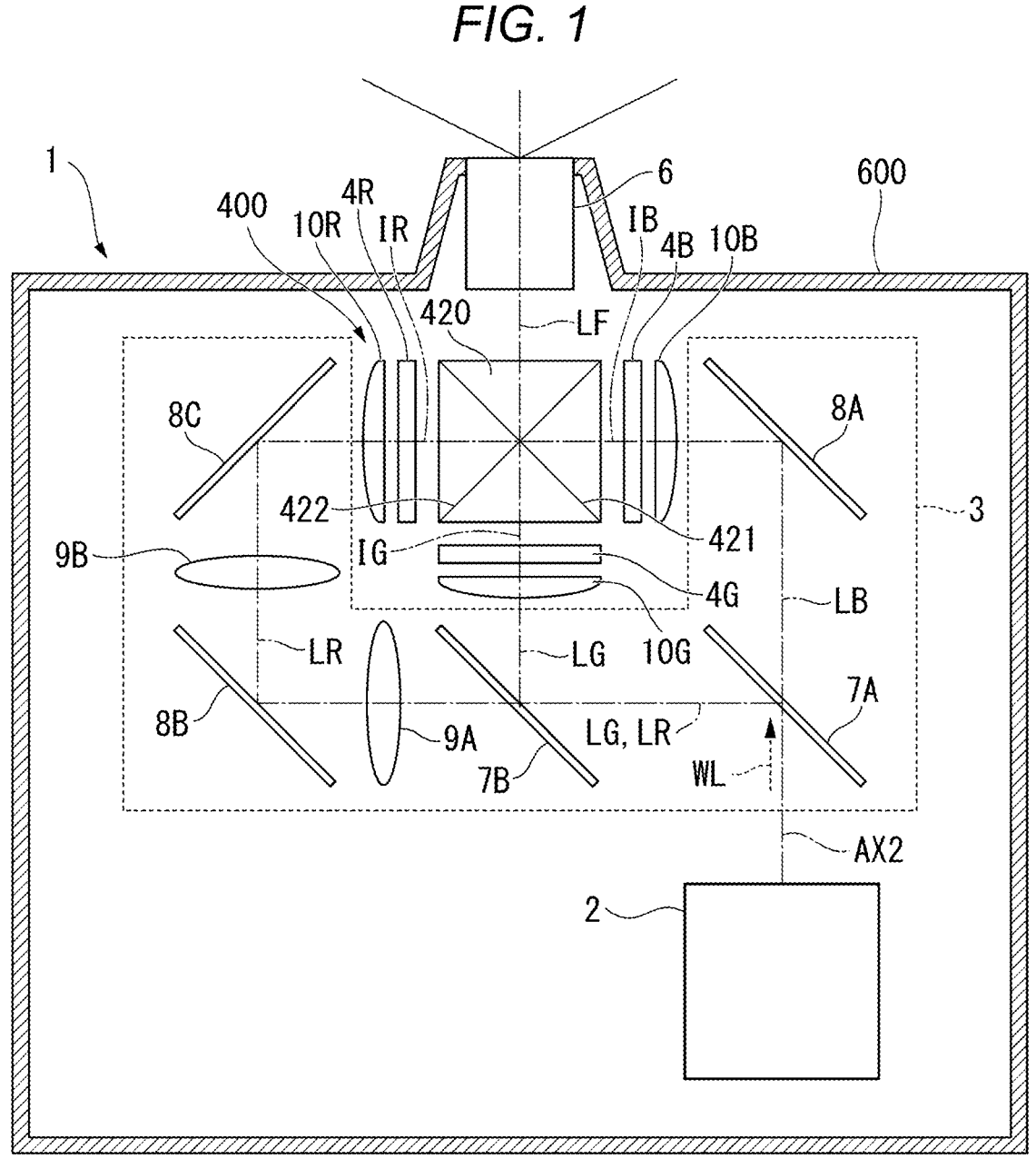
FIG. 1 is a schematic diagram of a projector according to a fifth embodiment.

A first embodiment of the present disclosure will hereinafter be described using FIG. 1 through FIG. 11. In the drawings described below, in order to make constituents eye-friendly, the scale ratio of the size is made different by the constituents.

Projector

FIG. 1 is a schematic view showing a configuration of a projector 1 according to the first embodiment. The projector 1 is a projection type display device for displaying a picture on a screen not shown, and is a projector having liquid crystal panels as light modulation devices for generating image light beams. As shown in FIG. 1, the projector 1 includes an exterior housing 600, an illumination device 2, a color separation optical system 3, light modulation devices 4R, 4G, and 4B, field lenses 10R, 10G, and 10B, a cross dichroic prism (a prism) 420, and a projection optical system (a lens) 6.

The exterior housing 600 is formed of resin which can be molded. The illumination device 2, the color separation optical system 3, the light modulation devices 4R, 4G, and 4B, the field lenses 10R, 10G, and 10B, and the cross dichroic prism 420 are housed inside the exterior housing 600. In the exterior housing 600, a side surface of a portion from which image light beam LF of a display target is emitted protrudes from a peripheral portion along an emission direction of the image light beam LF. A tip of the exterior housing 600 in the protruding portion is provided with an opening for emitting the image light beam. A tip portion ahead in the emission direction of the projection optical system 6 is exposed from the opening for emitting the image light beam. The rest of the portion other than the tip portion of the projection optical system 6 is housed inside the housing body 600.

The projector 1 is provided with a member not shown for supporting or fixing the constituents besides the constituents described above, and is provided with a cooling device or a cooling structure for cooling a constituent high in amount of heat generation out of the constituents. Besides the opening for emitting the image light beam described above, the housing body 600 is provided with an opening not shown for supplying air or discharging air.

The illumination device 2 emits illumination light WL having a white color along a light axis AX2. A configuration of the illumination device 2 will be described later.

The color separation optical system 3 separates the illumination light WL having entered the color separation optical system 3 from the illumination device 2 into red light LR, green light LG, and blue light LB. The color separation optical system 3 is provided with dichroic mirrors 7A, 7B, total reflection mirrors 8A, 8B, and 8C, and relay lenses 9A, 9B.

The dichroic mirror 7A transmits the blue light LB and reflects the green light LG and the red light LR out of the illumination light WL entering the dichroic mirror 7A from the illumination device 2 to thereby separate the illumination light WL into the blue light LB, and the green light LG and the red light LR. The dichroic mirror 7B reflects the green light LG entering the dichroic mirror 7B from the dichroic mirror 7A, and transmits the red light LR to thereby separate the green light LG and the red light LR from each other.

The total reflection mirror 8A is arranged in a light path of the blue light LB, and reflects the blue light LB, which has been transmitted through the dichroic mirror 7A, toward the light modulation device 4B. The total reflection mirror 8B and the total reflection mirror 8C are arranged in a light path of the red light LR, and guide the red light LR, which has been transmitted through the dichroic mirror 7B, to the light modulation device 4R. The green light LG is reflected from the dichroic mirror 7B toward the light modulation device 4G.

The relay lens 9A is arranged on the light path of the red light LR between the dichroic mirror 7B and the total reflection mirror 8B. The relay lens 9B is arranged on the light path of the red light LR between the total reflection mirrors 8B, 8C. The light path length of the red light LR from the dichroic mirror 7A to the cross dichroic prism 420 is longer than the light path length of the blue light LB and the light path length of the green light LG in the same range. By arranging the relay lenses 9A, 9B on the light path of the red light LR from the dichroic mirror 7A to the cross dichroic prism 420, there is compensated a light loss of the red light LR caused on the grounds that the light path length is longer compared to those of the blue light LB and the green light LG.

The light modulation device 4B modulates the blue light LB entering the light modulation device 4B in accordance with image information to form a blue image light beam IB. The light modulation device 4G modulates the green light LG entering the light modulation device 4G in accordance with the image information to form a green image light beam IG. The light modulation device 4R modulates the red light LR entering the light modulation device 4R in accordance with the image information to form a red image light beam IR.

The field lens 10B is arranged on the light path of the blue light LB between the total reflection mirror 8A and the light modulation device 4B to collimate the blue light LB entering the light modulation device 4B. The field lens 10G is arranged on the light path of the green light LG between the dichroic mirror 7B and the light modulation device 4G to collimate the green light LG entering the light modulation device 4G. The field lens 10R is arranged on the light path of the red light LR between the total reflection mirror 8C and the light modulation device 4R to collimate the red light LR entering the light modulation device 4R.

The image light beams IR, IG, and IB generated respectively by the light modulation devices 4R, 4G, and 4B enter the cross dichroic prism 420. The cross dichroic prism 420 combines the red image light beam IR, the green image light beam IG, and the blue image light beam IB with each other, and then emits a full-color image light beam LF thus combined toward the projection optical system 6.

The cross dichroic prism 420 is constituted by four rectangular prisms. In the top view shown in FIG. 1, the four rectangular prisms are arranged so that corners of respective vertex angles concentrate on the center of a surface of the cross dichroic prism 420. Out of interfaces between the two rectangular prisms adjacent to each other, the interfaces formed in alignment with each other form a reflecting surface 421 which reflects the blue image light beam IB, and transmits the green image light beam IG and the red image light beam IR. Out of interfaces between the two rectangular prisms adjacent to each other, on the interfaces formed in alignment with each other and perpendicular to the reflecting surface 421, there is formed a reflecting surface 422 which reflects the red image light beam IR, and transmits the green image light beam IG and the blue image light beam IB. The cross dichroic prism 420 functions as a light combining member for combining the image light beams IR, IG, and IB different in color from each other in the projector 1.

The light modulation devices 4R, 4G, and 4B and the cross dichroic prism 420 constitute an image-forming device 400 of the projector 1. In the image-forming device 400, the red image light beam IR, the green image light beam IG, and the blue image light beam IB are generated, wherein red, green, and blue are the three primary colors of light, and the red image light beam IR, the green image light beam IG, and the blue image light beam IB are combined with each other to generate the full-color image light beam LF. A configuration of the image-forming device 400 will be described later.

The projection optical system 6 is provided with a projection lens group including a plurality of refractive lenses. The projection optical system 6 projects the full-color image light beam LF combined by the cross dichroic prism 420 toward the screen not shown in an enlarged manner. This displays an enlarged picture on the screen.

Illumination Device

Figure 2:
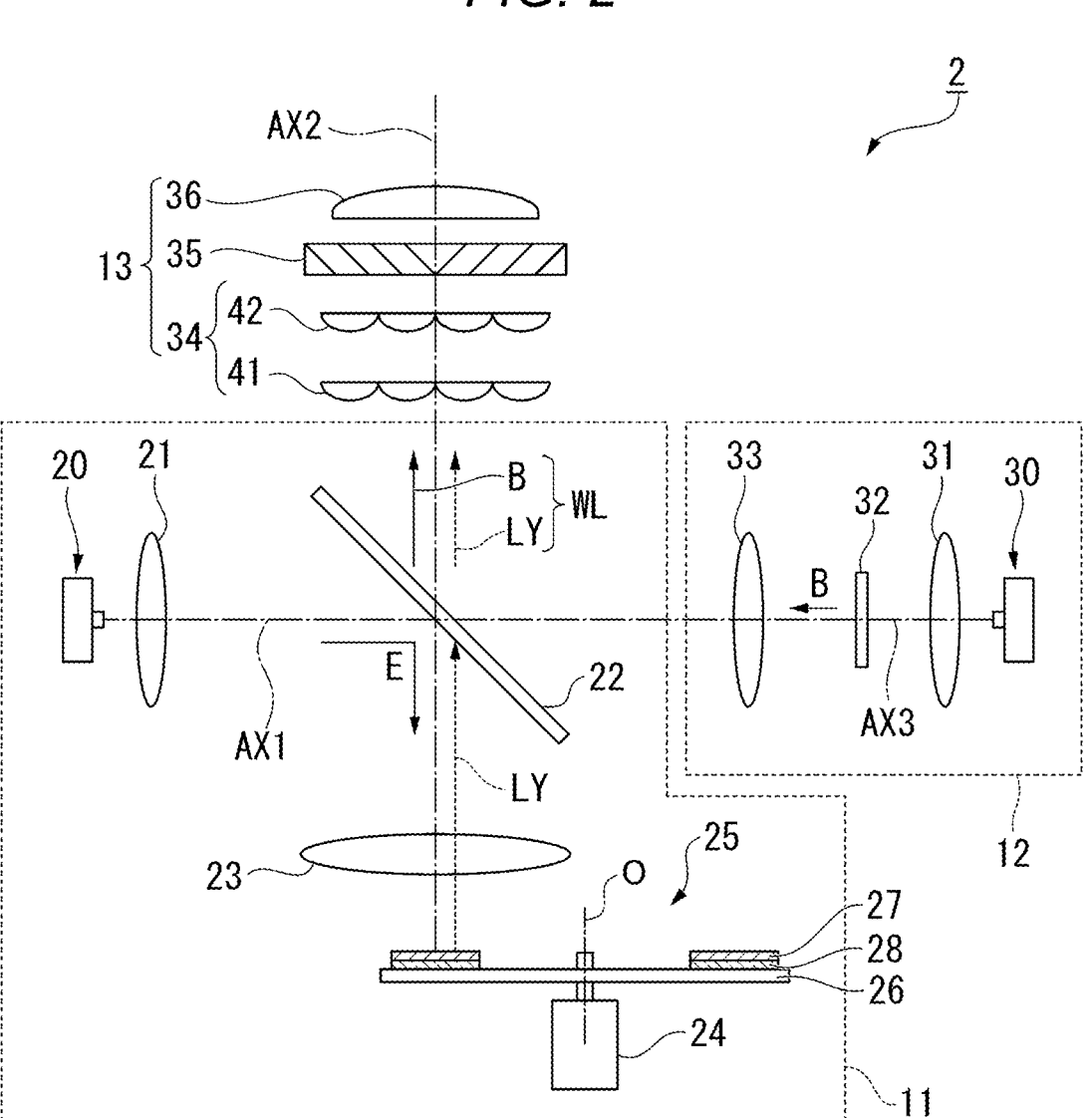
FIG. 2 is a schematic diagram of an illumination device provided to the projector shown in FIG. 1.

FIG. 2 is a schematic view showing a configuration of the illumination device 2. As shown in FIG. 2, the illumination device 2 is provided with light emitting devices 11, 12 and a homogenous illumination optical system 12.

The light emitting device 11 is provided with a light source 20, a collimating optical system 21, a dichroic mirror 22, a light collection optical system 23, and a phosphor wheel 25. The light source 20 is constituted by a semiconductor laser (an LD (Laser Diode)) for emitting blue light E. The wavelength at a peak of the light intensity of the blue light E emitted from the LD is, for example, 445 nm, and is set to a wavelength capable of exciting a phosphor layer 27 described later to generate yellow light LY. The light source 20 can be formed of a single LD, or can also be constituted by a plurality of LDs. The number of the LDs constituting the light source 20 is appropriately decided in accordance with a relationship between an intensity of the blue light E which is required for generating the yellow light LY having predetermined power assumed from a performance of the projector 1, and an intensity of the blue light E emitted from the single LD.

A light axis AX1 of the blue light E immediately after being emitted from the light source 20 is perpendicular to the light axis AX2 of the projector 1. The collimating optical system 21 is constituted by one or more convex lenses, collimates the blue light E emitted from the light source 20, and then emits the result toward the dichroic mirror 22.

The dichroic mirror 22 is arranged on a light path of the blue light E located in a range from the collimating optical system 21 to the light collection optical system 23. The dichroic mirror 22 is formed to have a plate shape, and has a reflecting surface. The reflecting surface of the dichroic mirror 22 is arranged so as to form an angle of 45 [deg.] with respect to each of the light axes AX1, AX2. The reflecting surface of the dichroic mirror 22 reflects the blue light E, and transmits the yellow light LY including the red light and the green light.

The light collection optical system 23 is formed of one or more convex lenses. The light collection optical system 23 collects the blue light E which is reflected by the dichroic mirror 22, and then proceeds in a direction parallel to the light axis AX2, and then makes the blue light enter the phosphor wheel 25, and then picks up and then collimates the yellow light LY emitted from the phosphor wheel 25.

The phosphor wheel 25 is a rotary phosphor plate for generating the yellow light LY using the blue light E as the excitation light, and is a reflective phosphor plate for emitting the yellow light LY in parallel to an incident direction of the blue light E, and in an opposite direction to the incident direction of the blue light E. The phosphor wheel 25 is provided with a motor 24, a substrate 26, the phosphor layer 27, and a reflecting layer 28.

The substrate 26 is a circular disk which is rotationally driven by the motor 24 along a circumferential direction around a rotational axis O, and centers on the rotational axis O. The substrate 26 is formed of a metal material excellent in heat radiation performance. The phosphor layer 27 is disposed on a plate surface to be irradiated with the blue light E in the substrate 26, and is formed like a ring centering on the rotational axis O. The phosphor layer 27 has a certain dimension in a radial direction centering on the rotational axis O. The phosphor layer 27 generates the yellow light LY as fluorescence using the blue light E entering the phosphor layer 27 as the excitation light. The phosphor layer 27 is a wavelength conversion layer for converting the blue light E entering the phosphor layer 27 into the yellow light LY having a wavelength band different from the wavelength band of the blue light.

The substrate 26 rotates at a predetermined rotational frequency due to the motor 24 operating while the projector 1 is in use. In the illumination device 2, since the phosphor layer 27 is intermittently irradiated with the blue light E having been reflected by the dichroic mirror 22 as the excitation light having high light intensity, an increase in operating life of the phosphor layer 27 is achieved.

The reflecting layer 28 is disposed between the phosphor layer 27 and the substrate 26. Between the phosphor layer 27 and the reflecting layer 28, there is disposed a bonding layer not shown. Between the reflecting layer 28 and the substrate 26, there is disposed a bonding layer not shown. The reflecting layer 28 has a dimension equivalent to that of the phosphor layer 27 in the radial direction centering on the rotational axis O. The reflecting layer 28 reflects the yellow light LY entering the reflecting layer 28 out of the yellow light LY generated in the phosphor layer 27 toward an opposite direction to the incident direction of the blue light E to the phosphor layer 27.

The light emitting device 12 is provided with a light source 30, a light collection optical system 31, a diffuser plate 32, and a collimating optical system 33. The light source 30 is formed of an LD for emitting blue light B. The wavelength at a peak of the light intensity of the blue light B emitted from the LD is, for example, 445 nm, and is set from a wavelength band of the blue light B obtained based on the performance including a color balance of the projector 1. The light source 30 can be formed of a single LD, or can also be constituted by a plurality of LDs. The number of the LDs constituting the light source 30 is appropriately decided in accordance with a relationship between an intensity of the blue light B assumed from a performance required for the projector 1, and an intensity of the blue light B emitted from the single LD.

A light axis AX3 of the blue light B immediately after being emitted from the light source 30 is perpendicular to the light axis AX2 of the projector 1, and is parallel to the light axis AX1. The light collection optical system 31 is constituted by one or more convex lenses, and collects the blue light B emitted from the light source 30 in the vicinity of the diffuser plate 32. The diffuser plate 32 diffuses the blue light B entering the diffuser plate 32 to form the blue light B having a light distribution similar to the light distribution of the yellow light LY emitted from the phosphor wheel 25. As the diffuser plate 32, there is used, for example, obscured glass. The collimating optical system 33 is constituted by one or more convex lenses, and collimates the blue light B emitted from the diffuser plate 32.

The blue light B having been emitted from the light emitting device 12 is reflected by the dichroic mirror 22, and then combined with the yellow light LY having been emitted from the phosphor wheel 25 and then transmitted through the dichroic mirror 22. By the blue light B and the yellow light LY being combined with each other, the illumination light WL having the white color is generated. The illumination light WL proceeds along the light axis AX2, and then enters the homogenous illumination optical system 13.

The homogenous illumination optical system 13 is provided with an integrator optical system 34, a polarization conversion member 35, and a superimposing lens 36. The integrator optical system 34 divides the illumination light WL entering the integrator optical system 34 from the dichroic mirror 22 into a plurality of light beams. The integrator optical system 34 has lens arrays 41, 42. Each of the lens arrays 41, 42 is constituted by a plurality of microlenses arranged in an array along a direction perpendicular to the light axis AX2.

The polarization conversion member 35 converts the illumination light WL emitted from the integrator optical system 34, and formed of a plurality of small light beams into linearly polarized light. The polarization conversion member 35 has a polarization separation film, a wave plate, and a mirror. The illumination light WL having been converted into the linearly polarized light by the integrator optical system 34 enters the superimposing lens 36. The illumination light WL entering the superimposing lens 36 from the polarization conversion member 35 is emitted by the superimposing lens 36 along the light axis AX2, and is superimposed with each other on the screen as the illumination target of the projector 1.

Figure 3:
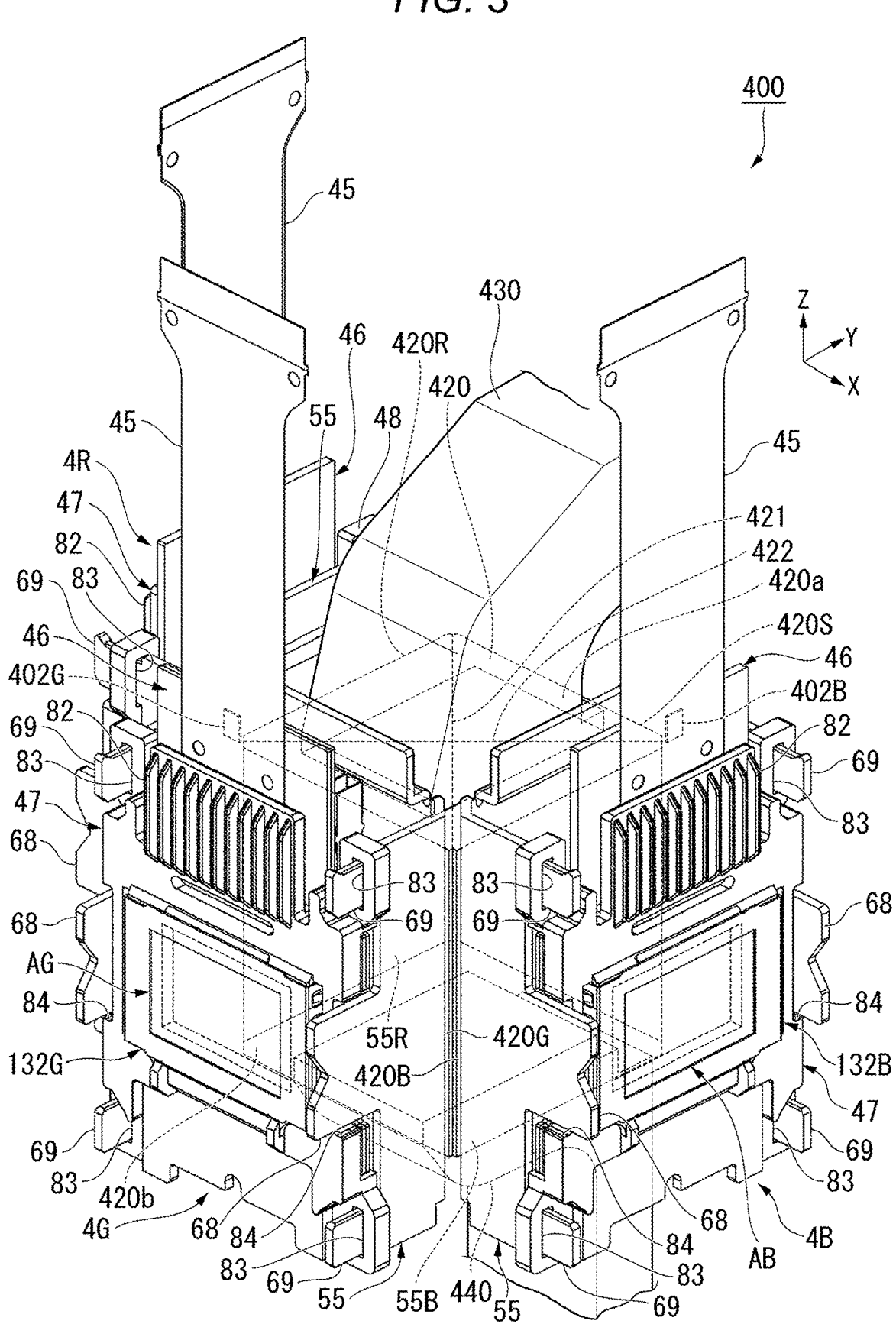
FIG. 3 is a perspective view of an image-forming device of the projector shown in FIG. 1.

FIG. 3 is a perspective view showing a configuration of the image-forming device 400. As shown in FIG. 3, the image-forming device 400 includes a liquid crystal panel 132R of the light modulation device 4R, a liquid crystal panel 132G of the light modulation device 4G, a liquid crystal panel 132B of the light modulation device 4B, and the cross dichroic prism 420. In FIG. 3, the liquid crystal panel 132R hides behind the cross dichroic prism 420, and is not illustrated.

The cross dichroic prism 420 has an obverse surface 420a, a bottom surface 420b, and side surfaces 420R, 420G, 420B, and 420S. Hereinafter, a direction which is parallel to a height direction of the cross dichroic prism 420, and which proceeds from the bottom surface 420b toward the obverse surface 420a is defined as a Z direction. A direction which is perpendicular to the Z direction, and which proceeds from the side surface 420R toward the side surface 420B is defined as an X direction. A direction which is perpendicular to the X direction and the Z direction, and which proceeds from the side surface 420G toward the side surface 420S is defined as a Y direction.

The side surfaces 420R, 420G, and 420B of the cross dichroic prism 420 are respectively opposed to the liquid crystal panels 132R, 132G, and 132B. In order to suppress the loss of the full-color image light beam LF combined by the cross dichroic prism 420, optical glass having a higher refractive index than that of general-purpose optical lens is used as a material of the cross dichroic prism 420.

The light modulation device 4G includes the liquid crystal panel 132G, a flexible board 45, a hybrid integrated circuit (IC) 402G, a metal member (a first metal member) 55, and a metal member 82.

The liquid crystal panel 132G converts the green light LG entering the light modulation device 4G into the green image light beam IG. The liquid crystal panel 132G is constituted by a liquid crystal layer not shown having a predetermined size in a Z-X plane parallel to the Z direction and the X direction, and substrates 46, 47 which sandwich the liquid crystal layer in the Y direction to hold the liquid crystal layer. The substrates 46, 47 can include a vapor chamber which develops a cooling function.

On a plate surface at a rear side in the Y direction in the substrate 46, there are arranged the same number of switching elements and pixel electrodes not shown as the number of pixels of the liquid crystal panel 132G. The substrate 47 is arranged at the rear side in the Y direction of the substrate 46. On a plate surface at a front side in the Y direction in the substrate 47, there are arranged opposed electrodes not shown corresponding to the plurality of pixel electrodes provided to the substrate 46. An area where the substrate 47, the liquid crystal layer, and the substrate 46 are sequentially stacked toward the Y direction in the liquid crystal panel 132G forms a green image display area AG. When viewed from the Y direction, the image display area AG overlaps the reflecting surfaces 421, 422 and the side surface 420S of the cross dichroic prism 420. On a plate surface at an opposite side to the plate surface having contact with the liquid crystal layer in the Y direction of each of the two substrates 46, 47, there is disposed a dustproof member not shown.

The flexible board 45 of the light modulation device 4G has flexibility, and can be bent at will. On a plate surface at the front side in the Y direction in the flexible board 45, namely a plate surface facing to the cross dichroic prism 420, there is printed a circuit pattern not shown.

A tip in the Z direction of the substrate 46 projects at the front side in the Z direction of a tip in the Z direction of the substrate 47. The hybrid IC 402G is disposed in an area at the front side in the Z direction of an area overlapping the image display area AG on a plate surface at the rear side in the Y direction of the substrate 46, and is sandwiched between the flexible board 45 and the substrate 46 in the Y direction. The hybrid IC 402G is electrically coupled to the circuit pattern formed on the flexible board 45. When the substrate 46 is provided with the vapor chamber as described above, the heat from the switching element and the hybrid IC 402G having contact with the substrate 46 is absorbed by the substrate 46, and it is difficult for the heat from the switching element and the hybrid IC 402G to be transferred to the metal member 55.

An end at the front side in the Z direction of the flexible board 45 is coupled to a drive power supply not shown. Based on the configuration described above, a predetermined voltage is applied to each of the pixels formed in the image display area AG in the liquid crystal panel 132G, and thus, the green light LG which enters each of the pixels is modulated.

The substrates 46, 47 having contact with each other without intervention of the liquid crystal layer, the flexible board 45, or the hybrid IC 402G in the Y direction are bonded to each other with a light curing adhesive formed of, for example, ultraviolet curing resin.

The metal member 82 of the light modulation device 4G is disposed in an area at the front side of the image display area AG in the Z direction, and at the same time, on a plate surface at the rear side in the Y direction in the substrate 47. The metal member 82 is constituted by a plurality of fins which further project rearward in the Y direction from the plate surface at the rear side in the Y direction of the substrate 47, and which have a predetermined length in the Z direction. The metal member 82 absorbs heat from the flexible board 45, and heat from the switching element and the hybrid IC 402G.

The metal member 55 of the light modulation device 4G holds the liquid crystal panel 132G, and is bonded to the side surface 420G of the cross dichroic prism 420 with a light curing adhesive.

The liquid crystal panel 132R of the light modulation device 4R converts the red light LR entering the light modulation device 4R into the red image light beam IR. The liquid crystal panel 132R is constituted by a liquid crystal layer not shown having a predetermined size in a Y-Z plane including the Y direction and the Z direction, and the substrates 46, 47 which sandwich the liquid crystal layer in the X direction to hold the liquid crystal layer. On a plate surface at a rear side in the X direction of the substrate 46, there are arranged the same number of switching elements and pixel electrodes not shown as the number of pixels of the liquid crystal panel 132R. On a plate surface at a front side in the X direction in the substrate 47 arranged at the rear side in the X direction of the substrate 46, there are arranged opposed electrodes not shown corresponding respectively to the plurality of pixel electrodes. An area where the substrate 47, the liquid crystal layer, and the substrate 46 are sequentially stacked toward the X direction in the liquid crystal panel 132R forms a red image display area AR. In FIG. 3, the image display area AR hides behind the cross dichroic prism 420, and is not illustrated, but overlaps the reflecting surfaces 421, 422 and the side surfaces 420R, 420B of the cross dichroic prism 420 when viewed from the X direction. On a plate surface at an opposite side to the plate surface having contact with the liquid crystal layer in the X direction of each of the two substrates 46, 47, there is disposed a dustproof member not shown.

In the light modulation device 4R, on a plate surface at the front side in the X direction in the flexible board 45, namely a plate surface facing to the cross dichroic prism 420, there is printed a circuit pattern not shown. The hybrid IC 402R is disposed in an area at the front side in the Z direction of an area overlapping the image display area AR on a plate surface at the rear side in the X direction of the substrate 46, and is sandwiched between the flexible board 45 and the substrate 46 in the X direction. The hybrid IC 402R hides behind the flexible board 45 of the light modulation device 4G, and is not illustrated in FIG. 3. The hybrid IC 402R is electrically coupled to the circuit pattern formed on the flexible board 45 of the light modulation device 4R. An end at the front side in the Z direction of the flexible board 45 of the light modulation device 4R is coupled to the drive power supply not shown. Similarly to the liquid crystal panel 132G, a predetermined voltage is applied to each of the pixels formed in the image display area AR in the liquid crystal panel 132R, and thus, the red light LR which enters each of the pixels is modulated.

In the light modulation device 4R, the substrates 46, 47 having contact with each other without intervention of the liquid crystal layer, the flexible board 45, or the hybrid IC 402R in the X direction are bonded to each other with a light curing adhesive. The metal member 55 of the light modulation device 4R holds the liquid crystal panel 132R, and is bonded to the side surface 420R of the cross dichroic prism 420 with a light curing adhesive.

The liquid crystal panel 132B of the light modulation device 4B converts the blue light LB entering the light modulation device 4B into the blue image light beam IB. The liquid crystal panel 132B is constituted by a liquid crystal layer not shown having a predetermined size in the Y-Z plane, and the substrates 46, 47 which sandwich the liquid crystal layer in the X direction to hold the liquid crystal layer. On a plate surface at the front side in the X direction of the substrate 46, there are arranged the same number of switching elements and pixel electrodes not shown as the number of pixels of the liquid crystal panel 132B. On a plate surface at the rear side in the X direction in the substrate 47 arranged at the front side in the X direction of the substrate 46, there are arranged opposed electrodes not shown corresponding to the plurality of pixel electrodes. An area where the substrate 47, the liquid crystal layer, and the substrate 46 are sequentially stacked toward an opposite direction to the X direction in the liquid crystal panel 132B forms a blue image display area AB. When viewed from the X direction, the image display area AB overlaps the reflecting surfaces 421, 422 and the side surfaces 420B, 420R of the cross dichroic prism 420. On a plate surface at an opposite side to the plate surface having contact with the liquid crystal layer in the X direction of each of the two substrates 46, 47, there is disposed a dustproof member not shown.

In the light modulation device 4B, on a plate surface at the rear side in the X direction in the flexible board 45, namely a plate surface facing to the cross dichroic prism 420, there is printed a circuit pattern not shown. The hybrid IC 402B is disposed in an area at the front side in the Z direction of an area overlapping the image display area AB on a plate surface at the front side in the X direction of the substrate 46, and is sandwiched between the flexible board 45 and the substrate 46 in the X direction. The hybrid IC 402B is electrically coupled to the circuit pattern formed on the flexible board 45 of the light modulation device 4B. An end at the front side in the Z direction of the flexible board 45 of the light modulation device 4B is coupled to the drive power supply not shown. Similarly to the liquid crystal panel 132G, a predetermined voltage is applied to each of the pixels formed in the image display area AB in the liquid crystal panel 132B, and thus, the blue light LB which enters each of the pixels is modulated.

In the light modulation device 4B, the substrates 46, 47 having contact with each other without intervention of the liquid crystal layer, the flexible board 45, or the hybrid IC 402B in the X direction are bonded to each other with a light curing adhesive. The metal member 55 of the light modulation device 4B holds the liquid crystal panel 132B, and is bonded to the side surface 420B of the cross dichroic prism 420 with a light curing adhesive.

In the image-forming device 400, the blue image light beam IB is emitted from the liquid crystal panel 132B of the light modulation device 4B, enters the cross dichroic prism 420 from an opposite direction to the X direction, and is transmitted through the area at the front side in the Y direction of the reflecting surface 422, and is reflected by the reflecting surface 421 toward the Y direction. The red image light beam IR is emitted from the liquid crystal panel 132R of the light modulation device 4R, enters the cross dichroic prism 420 from the X direction, and is transmitted through the area at the front side in the Y direction of the reflecting surface 421, and is reflected by the reflecting surface 422 toward the Y direction. The green image light beam IG is emitted from the liquid crystal panel 132G of the light modulation device 4G, enters the cross dichroic prism 420 from the Y direction, and is transmitted through the reflecting surfaces 421, 422. The blue image light beam IB reflected by the reflecting surface 421, the red image light beam IR reflected by the reflecting surface 422, and the green image light beam IG transmitted through the reflecting surfaces 421, 422 are superimposed on each other on the side surface 420S of the cross dichroic prism 420, and are thus combined with each other. The side surface 420S corresponds to a light combining surface in the cross dichroic prism 420.

The metal members 55 of the light modulation devices 4R, 4G, and 4B position the liquid crystal panels 132R, 132G, and 132B, and the image light beams IR, IG, and IB which enter the cross dichroic prism 420, and are combined with each other, respectively. In the alignment between the image light beams IR, IG, and IB, there is required such a high accuracy as a level equivalent to a pixel size. For example, when the position of one of the image light beams IR, IG, and IB is displaced as much as no smaller than the size of one pixel from the positions of other two thereof, a blur in color occurs in the full-color image light beam LF to be emitted from the side surface 420S of the cross dichroic prism 420, and thus, the sharpness and the color balance of the picture displayed from the projector 1 deteriorate.

Since each of the liquid crystal panels 132R, 132G, and 132B of the light modulation devices 4R, 4G, and 4B is held by the metal member 55 to the cross dichroic prism 420, the shift in the relative positions of the liquid crystal panels 132R, 132G, and 132B to the cross dichroic prism 420 due to the heat generated from a heat generator including the light sources 20, 30 and the drive power supply of the projector 1 is suppressed, and thus, the blur in the full-color image light beam LF and the deterioration of the sharpness of the picture are prevented. The material of the metal members 55 is, for example, aluminum (Al) or stainless steel (SUS (Steel Use Stainless)).

Although not shown in the drawings, each of the pixels of the liquid crystal panels 132R, 132G, and 132B is provided with a pixel circuit including the switching element, the pixel electrode, the liquid crystal layer, and the opposed electrode described above. In each of the image display areas AR, AG, and AB of the liquid crystal panels 132R, 132G, and 132B, there are included a plurality of data lines and a plurality of scanning lines. The plurality of scanning lines is arranged in parallel to each other. The plurality of data lines is arranged in parallel to each other so as to be perpendicular to the plurality of scanning lines. In each of the liquid crystal panels 132R, 132G, and 132B, a product of the total number of the data lines and the total number of the scanning lines is equivalent to the number of the pixels. At the intersections between the plurality of scanning lines and the plurality of data lines of the liquid crystal panels 132R, 132G, and 132B, there are disposed the pixel circuits of the liquid crystal panels 132R, 132G, and 132B, respectively. In the liquid crystal panels 132R, 132G, and 132B, the plurality of pixel circuits is arranged two-dimensionally in accordance with the same number of intersections as the product of the total number of the scanning lines and the total number of the data lines when viewed from the incident direction of each of the red light LR, the green light LG, and the blue light LB, respectively.

The plurality of scanning lines is coupled to a scanning line drive circuit not shown. The plurality of data lines is coupled to a data line drive circuit not shown. The data line drive circuit drives the plurality of data lines based on a video signal not shown supplied from the outside of the projector 1 via the flexible board 45. The data line drive circuit is coupled to the scanning line drive circuit.

In each of the pixel circuits of the liquid crystal panels 132R, 132G, and 132B, the switching element is formed of a TFT (Thin Film Transistor) not shown. A gate terminal of the TFT is coupled to the scanning line, a source terminal of the TFT is coupled to the data line, and a drain terminal of the TFT is coupled to the pixel electrode. The liquid crystal layer is disposed between the pixel electrode and the opposed electrode. The opposed electrodes are aggregated into a common electrode or an auxiliary line. The TFT is switched between an ON state and an OFF state in accordance with an application of a voltage, and thus functions as a switch.

In each of the pixel circuits of the liquid crystal panels 132R, 132G, and 132B, a plurality of line periods is included in one frame period. In each of the line periods, a single scanning line is selected from the plurality of scanning lines, a voltage with a predetermined value is applied to a plurality of scanning lines including the selected scanning line, and a voltage lower than the predetermined value is applied to the rest of the scanning lines. In the pixel circuit coupled to the scanning line to which the voltage with the predetermined value is applied, the TFT is in the ON state. The data line drive circuit applies voltages corresponding to the respective data lines to the plurality of data lines in accordance with the video signal in each of the line periods. Before the line period ends, the scanning line drive circuit lowers the voltage applied to the selected scanning line from the predetermined value. In association with the reduction in voltage in the selected scanning line in the scanning line drive circuit, the TFT of the pixel circuit coupled to the selected scanning line is switched to the OFF state, and a data voltage is written into the pixel circuit coupled to the selected scanning line. The luminance of the pixel corresponding to the pixel circuit varies in accordance with the data voltage written into the pixel circuit.

By writing the individual data voltages to the plurality of pixel circuits using the scanning line drive circuit and the data line drive circuit, the red light LR, the green light LG, and the blue light LB respectively entering the liquid crystal panels 132R, 132G, and 132B are modulated with the desired image, and thus, the red image light beam IR, the green image light beam IG, and the blue image light beam IB provided with the information of the desired image are generated.

Figure 4:
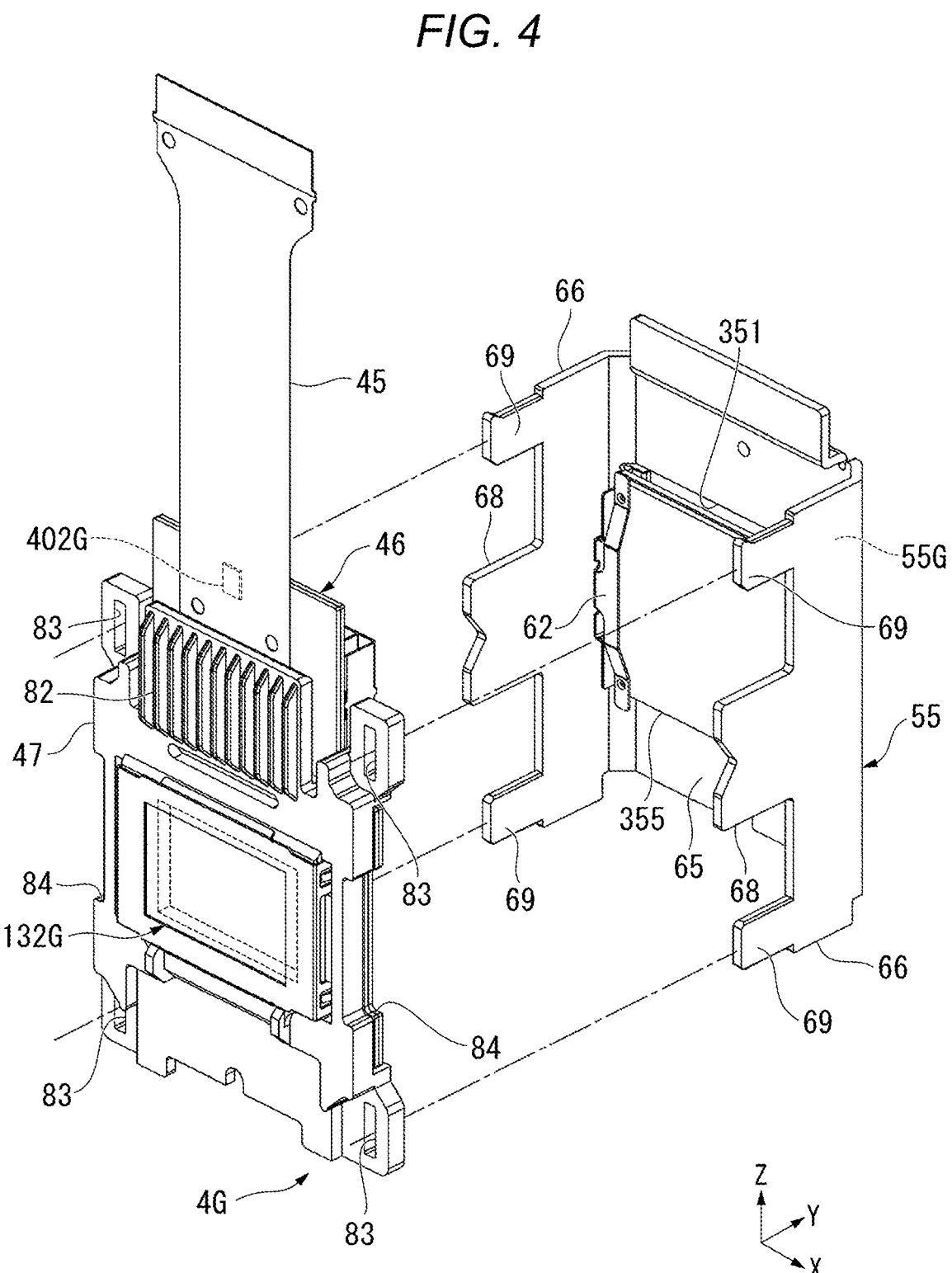
FIG. 4 is a partially-exploded perspective view of the image-forming device shown in FIG. 3.

FIG. 4 is a perspective view of the liquid crystal panel 132G and the metal member 55 exploded in the Y direction. As shown in FIG. 4, the metal member 55 has an attachment plate 65 and two coupling plates 66. The attachment plate 65 is formed to have a rectangular shape similarly to the side surface 420G of the cross dichroic prism 420, and has a plate surface parallel to the side surface 420G. The size in the X direction of the attachment plate 65 is slightly smaller than that of the side surface 420G. The size in the Z direction of the attachment plate 65 is larger than that of the side surface 420G. The attachment plate 65 is bonded to the side surface 420G using a light curing adhesive as described later.

The attachment plate 65 is provided with an opening 351. When viewed from the Y direction, the opening 351 includes the image display area AG of the liquid crystal panel 132G. On a plate surface at the rear side in the Y direction of the attachment plate 65 on the periphery of the opening 351, there is disposed an attachment member 62. With the attachment member 62, a polarization plate 355 is attached to the opening 351.

The coupling plates 66 project toward an opposite direction to the Y direction from both ends in the X direction of the attachment plate 65. At both ends in the Z direction of each of the coupling plates 66, there are formed protrusions 69 further projecting from the coupling plate 66 in the opposite direction to the Y direction. At the center in the Z direction of each of the coupling plates 66, there is formed a protrusion 68 further projecting from the coupling plate 66 in the opposite direction to the Y direction.

The substrate 47 of the liquid crystal panel 132G is provided with through holes 83 and grooves 84. The through holes 83 are each a hole which is formed at a position where the protrusion 69 can be inserted from the opposite direction to the Y direction in the substrate 47, and which penetrates the substrate 47 in the Y direction. The grooves 84 are each a groove which is formed at a position where the protrusion 68 can be inserted from the opposite direction to the Y direction in the substrate 47, and which is recessed toward the center in the X direction from a side end parallel to the Z direction in the substrate 47. In the state in which each of the protrusions 68 is inserted into the corresponding groove 84 from the opposite direction to the Y direction, and each of the protrusions 69 is inserted into the corresponding through hole 83 from the opposite direction to the Y direction, the protrusions 68, 69 are bonded to the substrate 47 with a light curing adhesive.

Here, going back to the description of FIG. 3, the metal member 55 of each of the light modulation devices 4R, 4B has the attachment plate 65 and the two coupling plates 66 similarly to the metal member 55 of the light modulation device 4G. In the light modulation devices 4R, 4B, the coupling plates 66 are provided with the protrusions 68, 69 similarly to the light modulation device 4G. The substrate 47 of each of the liquid crystal panels 132R, 132B is provided with the through holes 83 and the grooves 84. In the light modulation device 4R, the protrusions 68, 69 are bonded to the substrate 47 with a light curing adhesive in the state in which each of the protrusions 68 is inserted into the corresponding groove 84 from the opposite direction to the X direction, and each of the protrusions 69 is inserted into the corresponding through hole 83 from the opposite direction to the X direction. In the light modulation device 4B, the protrusions 68, 69 are bonded to the substrate 47 with a light curing adhesive in the state in which each of the protrusions 68 is inserted into the corresponding groove 84 in the X direction, and each of the protrusions 69 is inserted into the corresponding through hole 83 in the X direction. In each of the liquid crystal panels 132R, 132G, and 132B, it is possible for the through holes 83 and the grooves 84 to be provided to the substrate 46 instead of the substrate 47.

Figure 5:
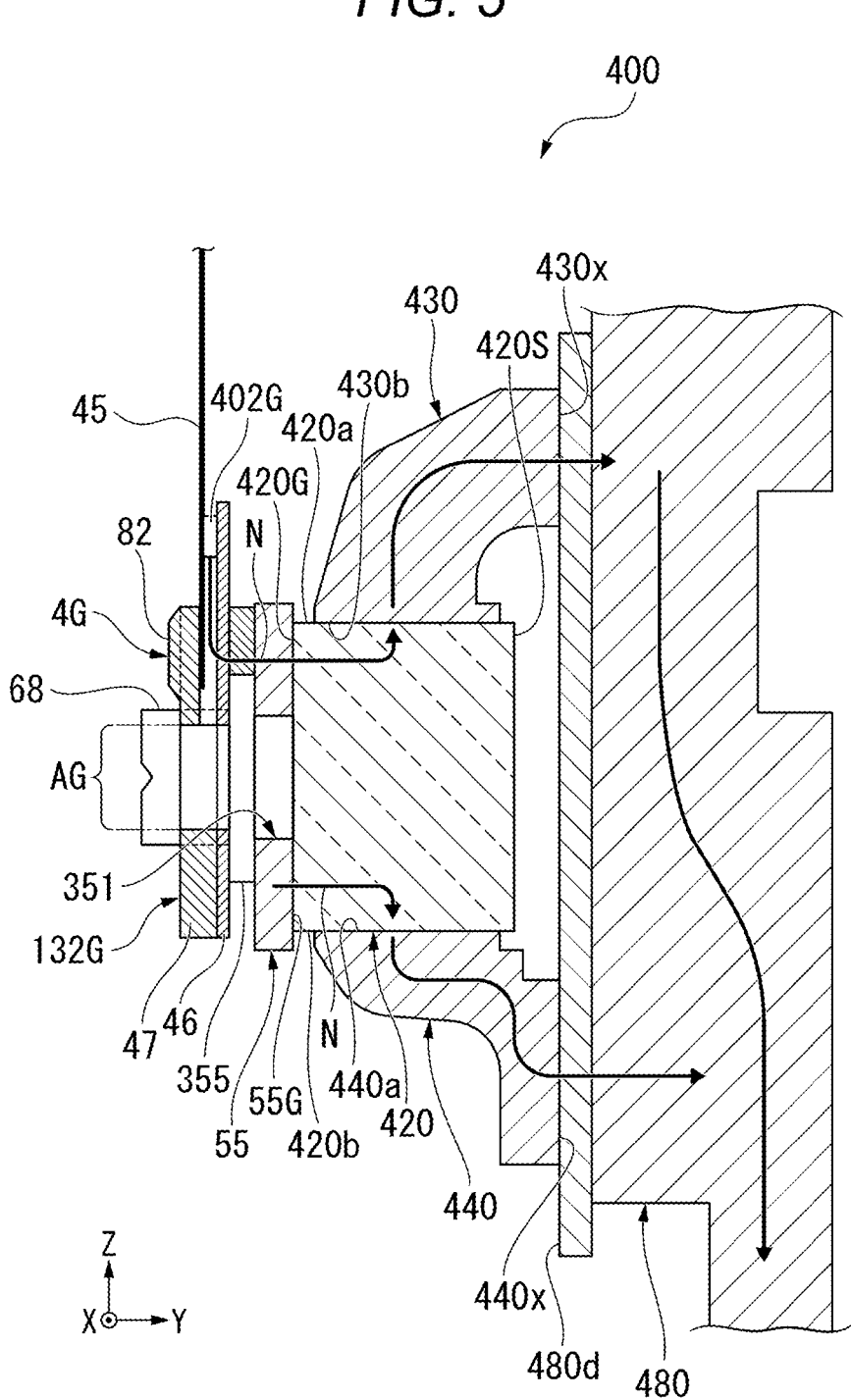
FIG. 5 is a cross-sectional view of a part of the image-forming device shown in FIG. 3.

FIG. 5 is a cross-sectional view of the image-forming device 400, and is a cross-sectional view of the image-forming device 400 cut through the image display area AG in parallel to the Y-Z plane. As shown in FIG. 5, since the metal member 55 which holds the liquid crystal panel 132G is bonded to the side surface 420G of the cross dichroic prism 420, the flexible board 45, the hybrid IC 402G, the substrate 46 made of metal of the liquid crystal panel 132G, the metal member 55 of the light modulation device 4G, and the cross dichroic prism 420 sequentially become adjacent to each other along the Y direction. A configuration between a side surface 55G at the front side in the Y direction of the metal member 55 and the side surface 420G opposed to the side surface 55G of the metal member 55 in the cross dichroic prism 420 will be described later.

The cross dichroic prism 420 is supported in the state of being sandwiched by metal members (third metal members) 430, 440 in the Z direction, and is fixed to a metal member (a second metal member) 480 via the metal members 430, 440. The metal member 480 supports each of the refractive lenses of the projection lens group provided to the projection optical system 6 of the projector 1.

The metal member 430 has an end surface 430b parallel to the X-Y plane, and an end surface 430x parallel to the Z-X plane. The metal member 430 extends in the Z direction from the end surface 430b, and then bends or deflects in the Y direction. The end surface 430b of the metal member 430 is opposed to the obverse surface 420a of the cross dichroic prism 420 via a light curing adhesive not shown. The metal member 430 is bonded to the cross dichroic prism 420 with the light curing adhesive. Since the end surface 430b is smaller than the obverse surface 420a when viewed from the opposite direction to the Z direction, a contact between the metal member 430 and the metal member 55 of each of the light modulation devices 4R, 4G, and 4B is avoided. The end surface 430x of the metal member 430 has contact with a side surface 480d at the rear side in the Y direction of the metal member 480. The metal member 430 is fixed to the metal member 480 with a fixation device including a fastening screw not shown.

The metal member 440 has an end surface 440a parallel to the X-Y plane, and an end surface 440x parallel to the Z-X plane. The metal member 440 extends toward an opposite direction to the Z direction from the end surface 440a, and then bends or deflects in the Y direction. The end surface 440a of the metal member 440 is opposed to the bottom surface 420b of the cross dichroic prism 420 via a light curing adhesive not shown. The metal member 440 is bonded to the cross dichroic prism 420 with the light curing adhesive. Since the end surface 440a is smaller than the bottom surface 420b when viewed along the Z direction, a contact between the metal member 440 and the metal member 55 of each of the light modulation devices 4R, 4G, and 4B is avoided. The end surface 440x of the metal member 440 has contact with the side surface 480d of the metal member 480. The metal member 440 is fixed to the metal member 480 with a fixation device including a fastening screw not shown.

Since the cross dichroic prism 420 is supported by the metal members 430, 440, and is fixed to the metal member 480 with the metal members 430, 440, there can be suppressed the shift in the relative position of the cross dichroic prism 420 to the projection lens group provided to the projection optical system 6 caused by the heat generated from the heat generator including the light sources 20, 30 of the projector 1 and the drive power supply. As a result, the blur in the full-color image light beam LF and the deterioration of the sharpness of the picture are prevented. The material of the metal members 430, 440, and 480 is, for example, Al or SUS.

The green image light beam IG modulated by the liquid crystal panel 132G of the light modulation device 4G is emitted toward the Y direction from the liquid crystal panel 132G, passes through the polarization plate 355 and the opening 351 in series, and then enters the cross dichroic prism 420 from the side surface 420G. Although not shown in the drawings, similarly to the light modulation device 4G, the red image light beam IR modulated by the liquid crystal panel 132R of the light modulation device 4R is emitted toward the X direction from the liquid crystal panel 132R, passes through the polarization plate 355 and the opening 351 of the light modulation device 4R in series, and then enters the cross dichroic prism 420 from the side surface 420R. The blue image light beam IB modulated by the liquid crystal panel 132B of the light modulation device 4B is emitted toward the opposite direction to the X direction from the liquid crystal panel 132B, passes through the polarization plate 355 and the opening 351 of the light modulation device 4B in series, and then enters the cross dichroic prism 420 from the side surface 420B.

Figure 6:
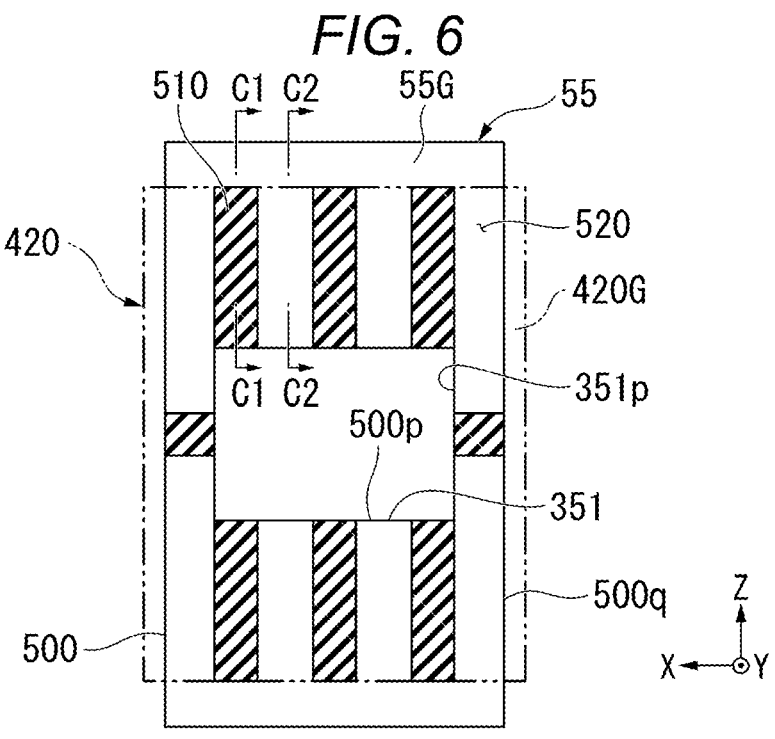
FIG. 6 is a front view of a part of the image-forming device shown in FIG. 3.

FIG. 6 is a diagram for explaining a bonding state between the metal member 55 of the light modulation device 4G and the cross dichroic prism 420 in the image-forming device 400 viewed from the Y direction. As shown in FIG. 6, in the X direction, the length of the side surface 55G of the metal member 55 is shorter than the length of the side surface 420G of the cross dichroic prism 420. In the Z direction, the length of the side surface 55G is longer than the length of the side surface 420G. The opening 351 through which the green image light beam IG passes is smaller than the side surface 420G of the cross dichroic prism 420. According to the magnitude relation described above, an opposed area (an area) 500 where the metal member 55 and the cross dichroic prism 420 are opposed to each other has a rectangular frame shape when viewed along the Y direction. An inner circumferential edge (a circumferential edge) 500p of the opposed area 500 is formed of a circumferential edge of the opening 351. An outer circumferential edge (circumferential edge) 500$q$ of the opposed area 500 is formed of a circumferential edge parallel to the Z direction out of the circumferential edge of the side surface 55G of the metal member 55, and a circumferential edge parallel to the X direction out of a circumferential edge of the side surface 420G of the cross dichroic prism 420.

Figure 7:
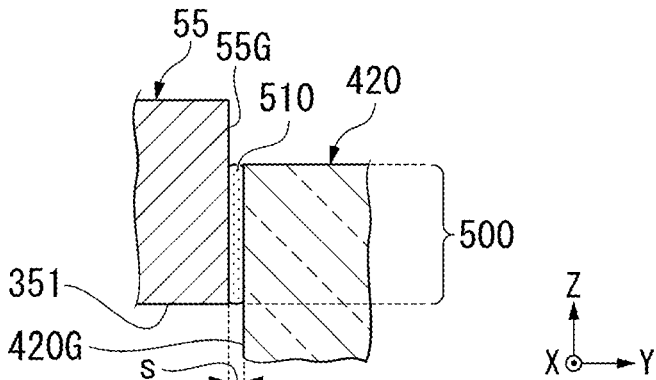
FIG. 7 is a cross-sectional view of the image-forming device viewed along the arrowed line C1-C1 shown in FIG. 6.
Figure 8:
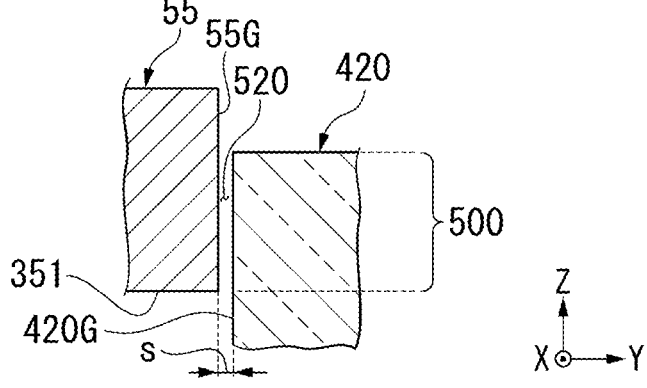
FIG. 8 is a cross-sectional view of the image-forming device viewed along the arrowed line C2-C2 shown in FIG. 6.

FIG. 7 is a cross-sectional view of the image-forming device 400 viewed along the arrowed line C1-C1 shown in FIG. 6. FIG. 8 is a cross-sectional view of the image-forming device 400 viewed along the arrowed line C2-C2 shown in FIG. 6. As shown in FIG. 6 through FIG. 8, in the opposed area 500, there are disposed adhesive layers 510 and air layers 520. The permittivity of the air layer 520 is 1.0 [F·m$^{-1}$]. The adhesive layers 510 and the air layers 520 are alternately disposed in a direction along the circumferential edge of the opposed area 500. The adhesive layer 510 plays a role of bonding the side surface 420G of the cross dichroic prism 420 and the side surface 55G of the metal member 55 to each other, positioning the light combining surface in the cross dichroic prism 420 and the image display area AG of the liquid crystal panel 132G to each other, and keeping a relative positional relationship between the metal member 55 and the cross dichroic prism 420. The adhesive layer 510 is, for example, an ultraviolet curing resin, and is formed of a light curing adhesive. By the adhesive layers 510 being formed of the light curing adhesive instead of a thermosetting adhesive, even when the heat is transferred to the metal member 55 while the projector 1 is in operation, the adhesive layers 510 do not melt or convert, and the relative positional relationship between the metal member 55 and the cross dichroic prism 420 is maintained.

As shown in FIG. 5, while the projector 1 is operating to display a picture, the hybrid ICs 402R, 420G, and 402B of the light modulation devices 4R, 4G, and 4B, and the drive power supply not shown for driving these hybrid ICs act as noise sources, and thus, the EMI noise N is generated from these hybrid ICs and the drive power supply. The EMI noise N passes through the flexible board 45, and propagates to the substrate 46 made of metal and the metal member 55. The adhesive layers 510 have permittivity corresponding to the type of the adhesive constituting the adhesive layers 510, and transmit the EMI noise N having reached the metal member 55 to the cross dichroic prism 420.

The cross dichroic prism 420 is formed of optical glass having a refractive index higher than that of general-purpose optical lens as described above, and therefore, has high permittivity corresponding to the refractive index. While the permittivity of the prism formed of the general-purpose optical glass is in a range of 3.7 through 10 [F·m$^{-1}$], the permittivity of the cross dichroic prism 420 is in a range of, for example, 8.0 through 10.0 [F·m$^{-1}$]. The cross dichroic prism 420 acts more strongly as a dielectric body as a capacitor with respect to the EMI noise N than the prism formed of the general-purpose optical glass. The EMI noise N is capacitively coupled using the cross dichroic prism 420 as the dielectric body, and propagates to the metal members 430, 440. The EMI noise N having propagated to the metal members 430, 440 propagates from the metal member 480 to a member and a chassis made of metal of the projector 1, and is emitted to the outside of the projector 1 as a result.

Figure 9:
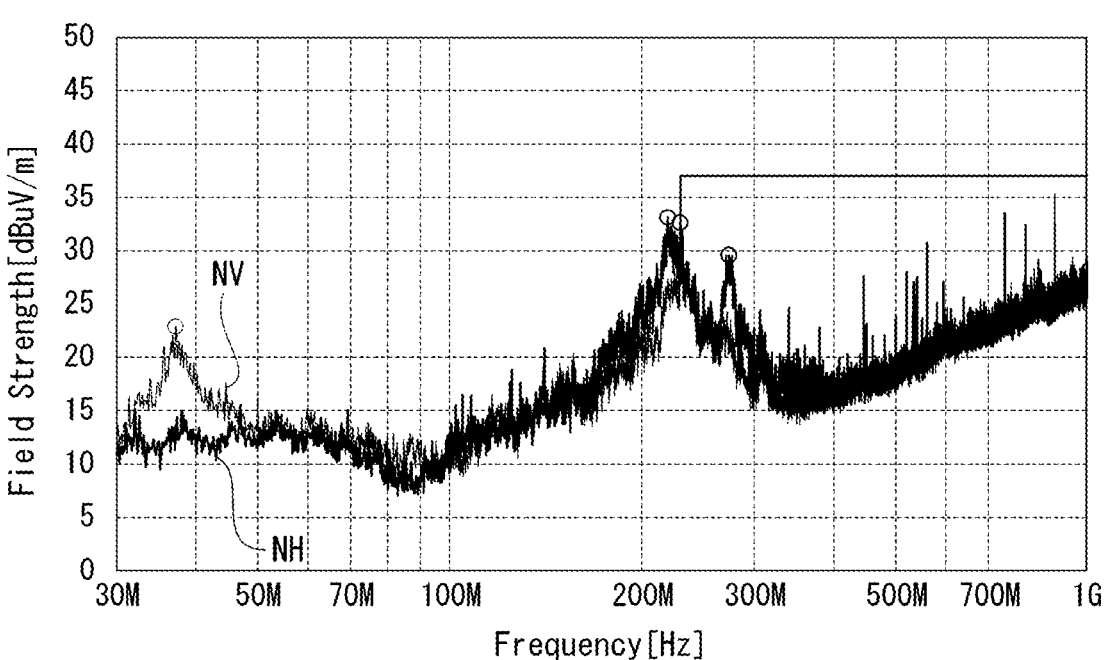
FIG. 9 is a diagram showing a measurement example of an EMI noise emitted from the projector shown in FIG. 1.

FIG. 9 is a graph showing an example of a measurement result of the EMI noise N emitted to the outside of the projector 1. An EMI noise NH in the graph shown in FIG. 9 represents a horizontal component of the EMI noise N. An EMI noise NV in the graph shown in FIG. 9 represents a vertical component of the EMI noise N. As shown in FIG. 9, a resonance peak of the EMI noises NH, NV occurs at a frequency 220 MHz. At the peak of the EMI noise N such as the resonance peak of the EMI noises NH, NV, when the EMI noise N supposedly becomes a predetermined value or higher, there is a possibility that the operation and the performance of electronic equipment other than the projector 1 is affected when the EMI noise N is emitted to the outside of the projector 1.

The proportion of the plurality of adhesive layers 510 to the opposed area 500 is represented by a proportion [%] of the sum area in the X-Z plane of the plurality of adhesive layers 510 to the total area in a plane parallel to the X-Z plane of the opposed area 500, and is hereinafter described as a proportion P. As long as the material of the adhesive layers 510 is the same, the higher the proportion P becomes, the stronger the bonding strength between the metal member 55 and the cross dichroic prism 420 becomes. On the other hand, the higher the proportion P becomes, the broader the path of the EMI noise N having reached the metal member 55 to the cross dichroic prism 420 becomes, and the stronger the EMI noise N emitted from the projector 1 becomes. The lower the proportion P becomes, the weaker the bonding strength between the metal member 55 and the cross dichroic prism 420 becomes. On the other hand, the lower the proportion P becomes, the narrower the path of the EMI noise N having reached the metal member 55 to the cross dichroic prism 420 becomes, and the weaker the EMI noise N emitted from the projector 1 becomes.

Figure 10:
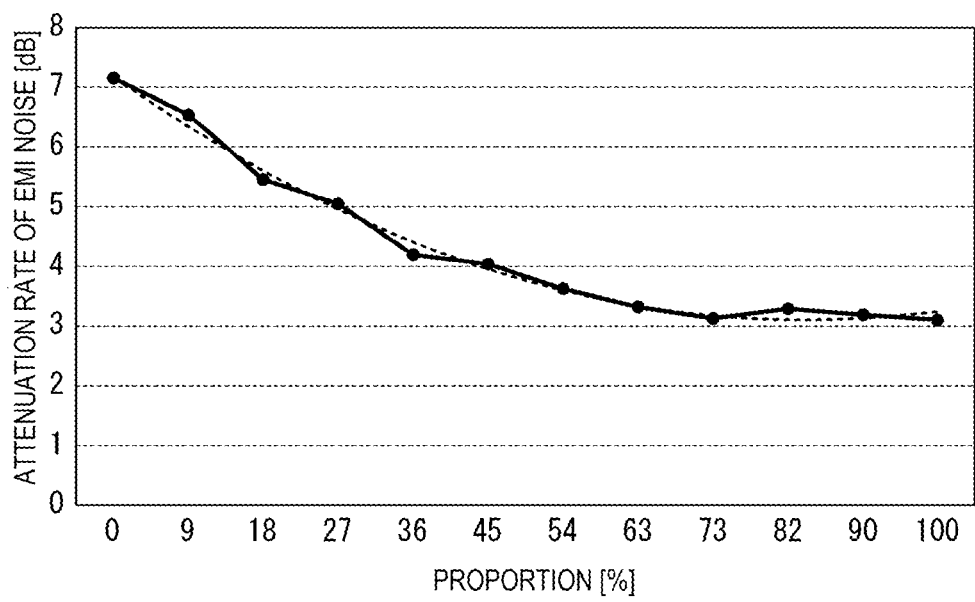
FIG. 10 is a graph showing a calculation example of the EMI noise emitted from the projector shown in FIG. 1.

FIG. 10 is a graph showing a simulation result with respect to a relationship between the proportion P and the EMI noise N. In the present simulation, the permittivity of the adhesive layers 510 is set to 5.0, and a distance s in the Y direction between the metal member 55 and the cross dichroic prism 420, namely a thickness of the adhesive layers 510, is set to 1 mm. An "ATTENUATION RATE OF EMI NOISE" on the vertical axis of the graph in FIG. 10 represents an attenuation rate taking the EMI noise N generated in a virtual initial model as an initial value, wherein in the virtual initial model, the metal member 55 and the cross dichroic prism 420 having predetermined sizes and shapes have direct contact with each other in the entire opposed area 500 without intervention of the adhesive layer 510 and the air layer 520. The "PROPORTION P" on the horizontal axis of the graph in FIG. 10 represents the proportion P [%] of the adhesive layer 510 to the opposed area 500 when each of the metal member 55 and the cross dichroic prism 420 have the predetermined size and shape the same as in the initial model. The proportion P=0 [%] represents a virtual state in which the adhesive layer 510 is not disposed in the opposed area 500, and the opposed area 500 is formed only of the air layer 520. The proportion P=100 [%] represents a conventional state in which the adhesive layer 510 is disposed in the entire opposed area 500, and the air layer 520 is not disposed at all.

By setting the distance s to 1 mm, and the adhesive layer with the thickness of 1 mm and the permittivity of 5.0 intervening between the metal member 55 and the cross dichroic prism 420, the EMI noise N is attenuated as much as about 3 [dB] with respect to the initial model in a range of the proportion P from 100[%] to about 73[%] as shown in FIG. 10. In a range in which the proportion P is lower than 73 [%], the attenuation rate of the EMI noise N increases as the proportion P decreases. In the condition of the present simulation, by disposing the air layer 520 at the proportion P lower than about 73% in the opposed area 500, it is possible to reduce the EMI noise N to be emitted from the projector 1 compared to the state in which the proportion P is 100%. The lowest proportion P out of the range of the proportion P in which the attenuation rate of the EMI noise is assumed as a certain amount decided by the distance s with respect to the initial model is described as a reference proportion $P_0$. In a result of the present simulation, the reference proportion $P_0$ is about 73%.

With respect the change in the proportion P lower than the reference proportion $P_0$, the attenuation rate of the EMI noise N and the bonding strength between the metal member 55 and the cross dichroic prism 420 are in a trade-off relationship as described above. In the present simulation, at the proportion P in a range of lower than the reference proportion $P_0$=73 [%], the lower the proportion P becomes, the higher the attenuation rate of the EMI noise N becomes, but the lower the bonding strength between the metal member 55 and the cross dichroic prism 420 becomes. When the bonding strength between the metal member 55 and the cross dichroic prism 420 excessively decreases, the metal member 55 is separated from the cross dichroic prism 420, and an operation failure of the projector 1 occurs. Therefore, the suitable proportion P is a proportion within a range lower than the reference proportion $P_0$, and higher than a minimum proportion P at which the bonding strength between the metal member 55 and the cross dichroic prism 420 can be ensured in good condition. The minimum proportion P at which the bonding strength between the metal member 55 and the cross dichroic prism 420 can be ensured in good condition is hereinafter described as a minimum proportion $P_1$.

The reference proportion $P_0$ and the minimum proportion $P_1$ vary by the type and the physicality of the adhesive constituting the adhesive layer 510, and the distance s. Therefore, when actually deciding the proportion P, the physicality values including the sizes, conductivity, and permittivity of each of the metal member 55, the cross dichroic prism 420, and the opening 351 are set equivalent to those of real ones, and then the relationship between the proportion P and the attenuation rate of the EMI noise N to the initial model is graphed in substantially the same procedure as the present simulation to decide the reference proportion $P_0$. Regarding the bonding strength, the relationship between the proportion P and the bonding strength between the metal member 55 and the cross dichroic prism 420 when varying the area occupied by the adhesive in the bonding area set to have an equivalent shape to the opposed area 500 with the adhesive to actually be used is calculated or measured using a simulation or an experiment, and thus, the minimum proportion $P_1$ is decided. The proportion P approximate to the minimum proportion $P_1$ is adopted within the range of the reference proportion $P_0$ and the minimum proportion $P_1$ thus decided.

Although not shown in the drawings, in the image-forming device 400, the opposed areas between side surfaces 55R, 55B of the metal members 55 of the light modulation devices 4R, 4B and the side surfaces 420R, 420B of the cross dichroic prism 420 each have a frame shape similarly to the opposed area 500 described above. In the opposed areas between the side surfaces 55R, 55B and the side surfaces 420R, 420B, respectively, there are disposed the adhesive layers and the air layers. The proportion of the adhesive layers to the opposed area between the side surfaces 55R, 55B and the side surfaces 420R, 420B, respectively, is arbitrarily decided similarly to the proportion P in the opposed area 500.

The projector 1 according to the first embodiment described hereinabove is provided with the light modulation device (a first light modulation device) 4G for emitting the image light beam (a first image light beam) IG, the light modulation devices (second light modulation devices) 4R, 4B for emitting the image light beams (second image light beams) IR, IB, the cross dichroic prism 420, the metal members (first metal members) 55, the lens of the projection optical system 6, the metal members (second metal members) 480, and the metal members (third metal members) 430, 440. The cross dichroic prism 420 combines the image light beam IG and the image light beams IR, IB with each other. The metal member 55 couples the light modulation device 4R and the cross dichroic prism 420 to each other. The lens of the projection optical system 6 projects the full-color image light beam LF combined by the cross dichroic prism 420. The metal member 480 supports the lens of the projection optical system 6. The metal members 430, 440 couple the cross dichroic prism 420 and the metal member 480 to each other. In the projector 1, the air layers 520 are disposed in the opposed area 500 where the metal member 55 and the cross dichroic prism 420 are opposed to each other.

Figure 11:
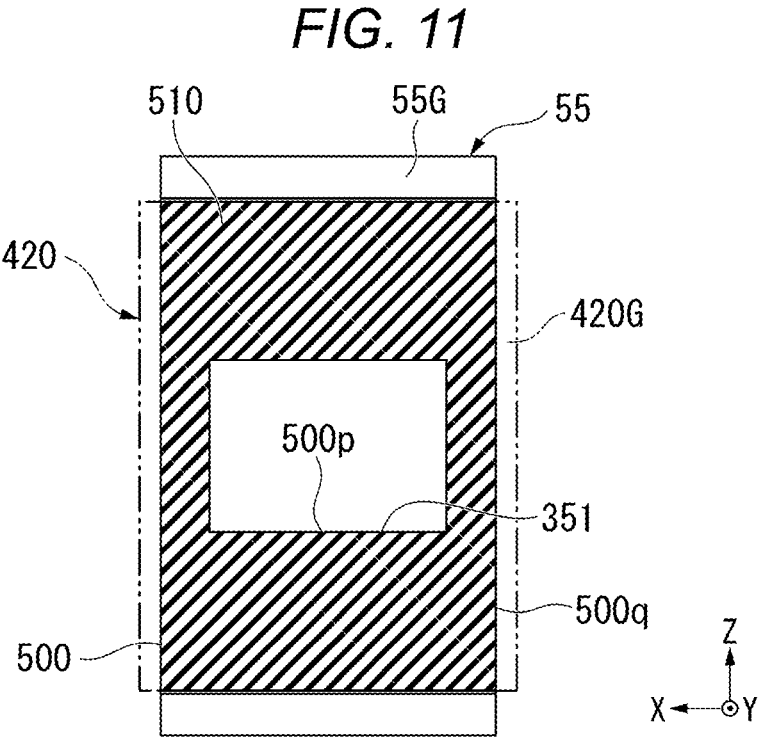
FIG. 11 is a front view of a part of a related-art image-forming device.

FIG. 11 is a front view showing a related-art image-forming device when the adhesive layer 510 is disposed in the opposed area 500 at the proportion P=100 [%]. In the projector 1 according to the first embodiment, when giving weight to increasing the bonding strength between the metal member 55 and the cross dichroic prism 420 as in the related art, the adhesive layer 510 is disposed in the opposed area 500 at the proportion P of 100 [%] as shown in FIG. 11. According to the projector 1 related to the first embodiment, by disposing the air layer 520 in the opposed area 500, the path through which the EMI noise N having reached the metal member 55 propagates to the cross dichroic prism 420 is narrowed, and thus, it is possible to prevent a noise current generated from the noise source of the light modulation devices 4R, 4G, and 4B including the hybrid ICs 402R, 402G, and 402B, and the drive power supply of these hybrid ICs, namely the EMI noise N, from propagating to the cross dichroic prism 420 and the metal members 430, 440, and 480. This can reduce the EMI noise N emitted from the projector 1.

According to the projector 1 related to the first embodiment, since the proportion P is set within the range no lower than the minimum proportion $P_1$ and no higher than the reference proportion $P_0$ in the opposed area 500, it is possible to ensure the bonding strength between the metal member 55 and the cross dichroic prism 420 in good condition to the extent that the metal member 55 is not separated from the cross dichroic prism 420, and further, it is possible to reduce the EMI noise N which propagates from the metal member 55 to the cross dichroic prism 420, and the metal members 430, 440, and 480. The closer to the minimum proportion $P_1$ the proportion P is within the range no lower than the minimum proportion $P_1$ and no higher than the reference proportion $P_0$, the further the EMI noise N is reduced under the condition that the bonding strength between the metal member 55 and the cross dichroic prism 420 is ensured in good condition as described above.

In the projector 1 according to the first embodiment, the opposed area 500 has the frame shape surrounding the opening 351 of the light modulation device 4G through which the image light beam IG emitted from the liquid crystal panel 132G passes. The adhesive layers 510 for bonding the metal member 55 and the cross dichroic prism 420 to each other, and the air layers 520 are alternately disposed so as to be adjacent to each other in the direction along the inner circumferential edge 500p and the outer circumferential edge 500q of the opposed area 500, namely the circumferential edge 351*p* of the opening 351. According to the projector 1 related to the first embodiment, by adjusting the size and the number of the air layers 520 in the direction along the inner circumferential edge 500*p* and the outer circumferential edge 500*q*, it is possible to easily adjust the proportion P and an amount of propagation of the EMI noise N from the metal member 55 to the cross dichroic prism 420.

It should be noted that the first image light beam in the present specification and the appended claims is assumed as the image light beam IG, but can also be the image light beam IR or the image light beam IB. When the first image light beam is the image light beam IR, the first light modulation device is the light modulation device 4R, the second image light beams are the image light beams IG, IB, and the second light modulation devices are the light modulation devices 4G, 4B. When the first image light beam is the image light beam IB, the first light modulation device is the light modulation device 4B, the second image light beams are the image light beams IR, IG, and the second light modulation devices are the light modulation devices 4R, 4G.

Second Embodiment

Then, a second embodiment of the present disclosure will be described using FIG. 12 and FIG. 13.

It should be noted that in each of the second embodiment and the subsequent embodiments, constituents common to the precedent embodiments are denoted by the same reference symbols, and the description thereof will be omitted. In each of the second embodiment and the subsequent embodiments, configurations and contents different from those of the precedent embodiments will mainly be described.

A projector according to the second embodiment is provided with substantially the same configuration as that of the projector 1 according to the first embodiment. It should be noted that an image-forming device of the projector according to the second embodiment is different from that of the first embodiment in the arrangement of the air layer 520 in the opposed area 500 between the metal member 55 for holding the liquid crystal panel of the light modulation device and the cross dichroic prism 420.

Figure 12:
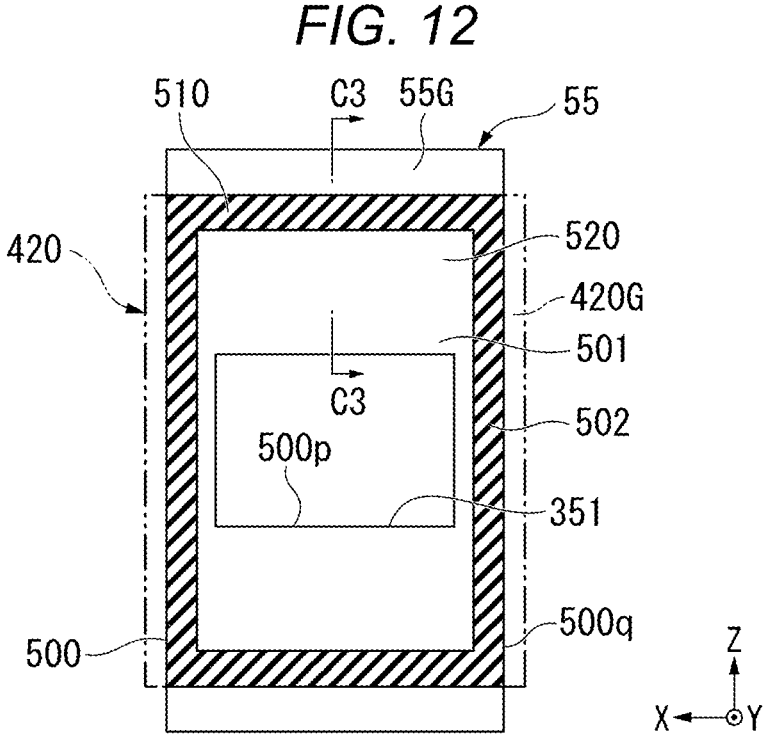
FIG. 12 is a front view of a part of an image-forming device according to a second embodiment.
Figure 13:
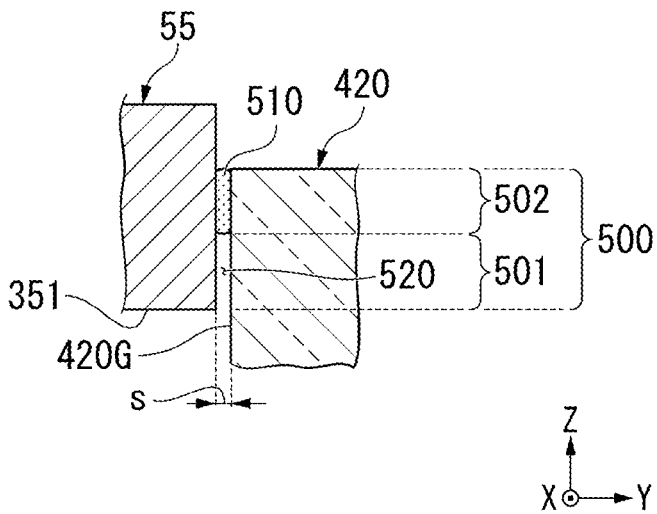
FIG. 13 is a cross-sectional view of the image-forming device viewed along the arrowed line C3-C3 shown in FIG. 12.

FIG. 12 is a diagram for explaining a bonding state between the metal member 55 of the light modulation device 4G and the cross dichroic prism 420 in the image-forming device of the projector according to the second embodiment viewed from the Y direction. As shown in FIG. 12, the opposed area 500 in the second embodiment has a rectangular frame shape when viewed along the Y direction similarly to the first embodiment. FIG. 13 is a cross-sectional view of the image-forming device in the second embodiment viewed along the arrowed line C3-C3 shown in FIG. 12. As shown in FIG. 12 and FIG. 13, in the opposed area 500 of the image-forming device in the second embodiment, the air layer 520 is disposed in an area 501 at an inner side closer to the center in the front view viewed from a direction parallel to the Y direction out of the opposed area 500. The adhesive layer 510 is disposed in an area 502 at an outer side of the air layer 520 in the opposed area 500.

When deciding the proportion P of the adhesive layer 510 to the opposed area 500, the physicality values including the sizes, conductivity, and permittivity of each of the metal member 55, the cross dichroic prism 420, and the opening 351 are set equivalent to those of real ones, and then the relationship between the proportion P and the attenuation rate of the EMI noise to the initial model described in the first embodiment is graphed to decide the reference proportion $P_0$ similarly to the first embodiment. Regarding the bonding strength, the relationship between the proportion P and the bonding strength between the metal member 55 and the cross dichroic prism 420 when varying the area occupied by the adhesive in the bonding area set to have an equivalent shape to the opposed area 500 with the adhesive to actually be used is calculated or measured using a simulation or an experiment, and thus, the minimum proportion $P_1$ is decided. The proportion P approximate to the minimum proportion $P_1$ is adopted within the range of the reference proportion $P_0$ and the minimum proportion $P_1$ thus decided.

The projector according to the second embodiment described hereinabove is provided with substantially the same constituents as those of the projector 1 according to the first embodiment, and the air layer 520 is disposed in the opposed area 500. According to the projector related to the second embodiment, it is possible to decrease in size of the path of the EMI noise N having reached the metal member 55 between the metal member 55 and the cross dichroic prism 420 compared to the state in which the adhesive layer 510 is disposed in the entire opposed area 500 to thereby reduce the EMI noise N propagating from the cross dichroic prism 420 to the metal members 430, 440, and 480. This can reduce the EMI noise N emitted from the projector.

In the projector according to the second embodiment, the opposed area 500 has the frame shape surrounding the opening 351 of the light modulation device 4G through which the image light beam IG passes, and in the opposed area 500, the adhesive layer 510 is disposed in the area 502 at the outer side of the area 501 where the air layer 520 is disposed with respect to the opening 351. According to the projector related to the second embodiment, by adjusting the area ratio between the inner area and the outer area in the opposed area 500, it is possible to easily adjust the proportion P and the amount of the propagation of the EMI noise N from the metal member 55 to the cross dichroic prism 420. According to the projector related to the second embodiment, since the air layer 520 is disposed at the inner side in the opposed area 500, it is possible to surely prevent the leakage of the adhesive layer 510 from the opposed area 500 to the opening 351 compared to the projector 1 according to the first embodiment.

Third Embodiment

Then, a third embodiment of the present disclosure will be described using FIG. 14 through FIG. 17.

A projector according to the third embodiment is provided with substantially the same configuration as that of the projector 1 according to the first embodiment. An image-forming device of the projector according to the third embodiment is substantially the same as that of the first embodiment in the arrangement of the air layers 520 in the opposed area 500 between the metal member 55 for holding the liquid crystal panel of the light modulation device and the cross dichroic prism 420. It should be noted that the distance s between the side surface 55G of the metal member 55 in the area provided with the air layer 520 out of the opposed area 500 and the side surface 420G of the cross dichroic prism 420 is different from that in the first embodiment.

Figure 14:
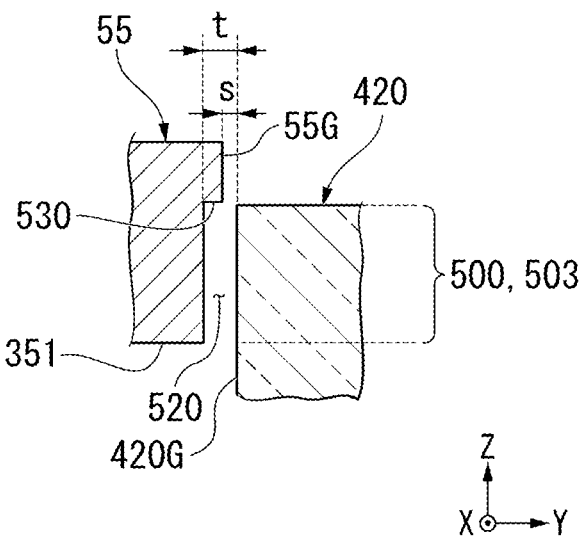
FIG. 14 is a cross-sectional view of a part of an image-forming device according to a third embodiment.

FIG. 14 is a cross-sectional view of the image-forming device in the third embodiment, and is a diagram corresponding to when viewed along the arrowed line C2-C2 shown in FIG. 6. As shown in FIG. 14, the side surface 55G of the metal member 55 in an area 503 where the air layer 520 is disposed out of the opposed area 500 is provided with a recessed part 530. The recessed part 530 is recessed toward an opposite direction to the Y direction from the side surface 55G on the periphery thereof. By providing the area 503 with the recessed part 530, a distance t in the Y direction between the metal member 55 and the cross dichroic prism 420 is made longer than the distance s in the area 503. The longer the distance t becomes, the more difficult for the EMI noise N having reached the metal member 55 it becomes to be transferred to the cross dichroic prism 420, and the weaker the EMI noise N to be emitted from the projector becomes.

Figure 15:
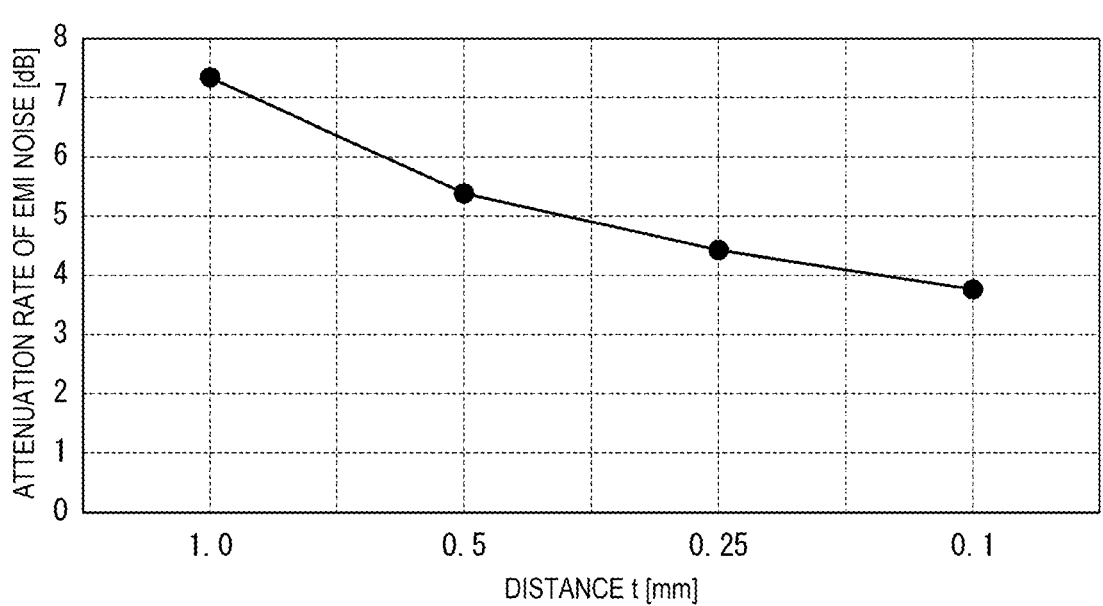
FIG. 15 is a graph showing a calculation example of an EMI noise emitted from a projector according to the third embodiment.

FIG. 15 is a graph showing a simulation result with respect to a relationship between the distance t and the EMI noise N. Similarly to the vertical axis of the graph shown in FIG. 10, the "ATTENUATION RATE OF EMI NOISE" on the vertical axis in FIG. 15 represents an attenuation rate taking the EMI noise N generated in a virtual initial model as an initial value, wherein in the virtual initial model, the metal member 55 and the cross dichroic prism 420 having predetermined sizes and shapes have direct contact with each other in the entire opposed area 500 without intervention of the adhesive layer 510 and the air layer 520. In the present simulation, the distance t is varied to 1.0 [mm], 0.5 [mm], 0.25 [mm], and 0.1 [mm], and the conditions related to the metal member 55, the cross dichroic prism 420, and the opposed area 500 other than the distance t are all fixed. As shown in FIG. 15, as the distance t decreases from 1.0 [mm] to 0.1 [mm], the attenuation rate of the EMI noise N increases. When each of the proportion P and the distance s between the side surface 55G of the metal member 55 and the side surface 420G of the cross dichroic prism 420 in the area where the adhesive layer 510 is disposed in the opposed area 500 is constant, the longer the distance s becomes, the weaker the EMI noise N propagating from the metal member 55 to the cross dichroic prism 420 becomes.

The projector according to the third embodiment described hereinabove is provided with substantially the same constituents as those of the projector 1 according to the first embodiment, and the air layer 520 is disposed in the opposed area 500. According to the projector related to the third embodiment, it is possible to decrease in size of the path of the EMI noise N having reached the metal member 55 between the metal member 55 and the cross dichroic prism 420 compared to the state in which the adhesive layer 510 is disposed in the entire opposed area 500 to thereby reduce the EMI noise N propagating from the cross dichroic prism 420 to the metal members 430, 440, and 480. This can reduce the EMI noise N emitted from the projector.

In the projector according to the third embodiment, in the opposed area 500, the recessed part 530 is formed on the side surface 55G of the metal member 55 opposed thereto across the air layer 520. According to the projector related to the third embodiment, it is possible to reduce the amount of the propagation of the EMI noise N from the metal member 55 to the cross dichroic prism 420 compared to the configuration in which the recessed part 530 is not formed on the side surface 55G of the metal member 55.

Figure 16:
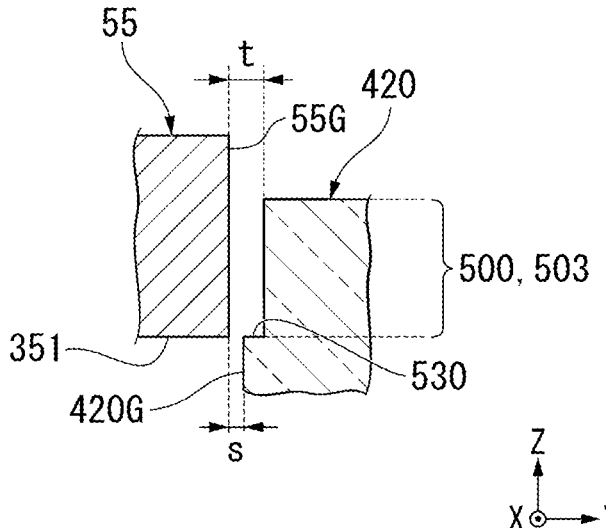
FIG. 16 is a cross-sectional view of an image-forming device according to a first modified example of the third embodiment.
Figure 17:
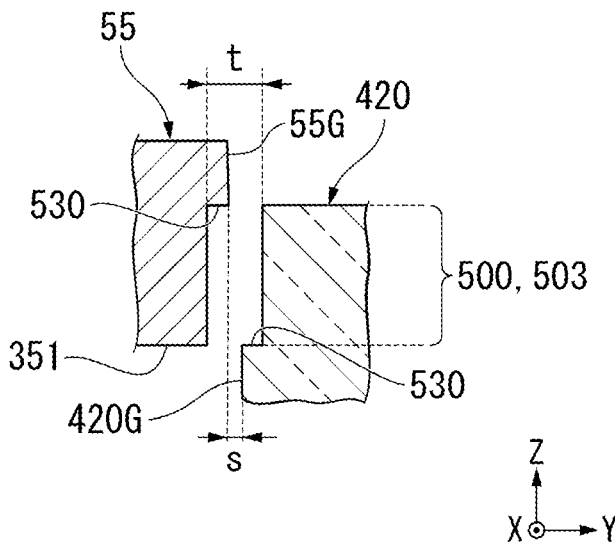
FIG. 17 is a cross-sectional view of an image-forming device according to a second modified example of the third embodiment.

FIG. 16 is a cross-sectional view of an image-forming device in a first modified example of the third embodiment. FIG. 17 is a cross-sectional view of an image-forming device in a second modified example of the third embodiment. In the configuration shown in FIG. 14, the recessed part 530 is formed on the side surface 55G of the metal member 55, but it is possible for the recessed part 530 to be formed on the side surface 420G of the cross dichroic prism 420 in the area 503 as shown in FIG. 16 as a first modified example of the image-forming device of the projector according to the third embodiment. As a second modified example of the image-forming device of the projector according to the third embodiment, it is possible for the recessed part 530 to be formed on the side surface 55G of the metal member 55 and the side surface 420G of the cross dichroic prism 420 as shown in FIG. 17. According to the first modified example and the second modified example of the image-forming device of the projector related to the third embodiment, it is possible to reduce the amount of the propagation of the EMI noise N from the metal member 55 to the cross dichroic prism 420 compared to the configuration in which the recessed part 530 is not formed similarly to the image-forming device of the projector according to the third embodiment described above.

In the projector according to the third embodiment, or the first modified example and the second modified example of the third embodiment, by adjusting the distance t, it is possible to easily adjust the amount of the propagation of the EMI noise N from the metal member 55 to the cross dichroic prism 420. In order to obtain the bonding strength between the metal member 55 and the cross dichroic prism 420 in good condition, the distance s between the areas where the adhesive layers 510 are disposed out of the opposed area 500 is limited within a predetermined range by the type and the physicality of the adhesive constituting the adhesive layer 510. When the distance s is set within a predetermined range in the projector 1 according to the first embodiment, and the range no lower than the minimum proportion $P_1$ and no higher than the reference proportion $P_0$ is narrow to the extent that it is difficult to decide the proportion P, it is possible to adopt the configuration of the projector according to the third embodiment to set the proportion P to a value equivalent to the minimum proportion $P_1$ based on the distance s, and then arbitrarily set the distance t increased so that the attenuation amount of the EMI noise N falls within a predetermined range required for the projector 1, or so as to fulfill a predetermined condition.

It should be noted that in the projector according to the second embodiment, it is possible to form the recessed part 530 on at least one of the side surface 55G of the metal member 55 and the side surface 420G of the cross dichroic prism 420 in the area 501 out of the opposed area 500. By forming the recessed part 530 on at least one of the side surface 55G and the side surface 420G in the area 501 in the projector according to the second embodiment, it is possible to reduce the amount of the propagation of the EMI noise N from the metal member 55 to the cross dichroic prism 420 compared to the configuration in which the recessed part 530 is not formed.

Some preferred embodiments of the present disclosure are hereinabove described in detail, but the present disclosure is not limited to such specific embodiments, and there can be adopted a variety of modifications and alterations within the scope and the spirit of the present disclosure set forth in the appended claims. Further, the constituents of the plurality of embodiments can arbitrarily be combined with each other. Although significant functions and advantages are described with respect to the embodiments described above, there can be obtained functions and advantages of other embodiments to which the configuration provided to the own light source device is applicable without describing the details.

In the projector 1 according to the first embodiment, or the projectors according to the second embodiment and the third embodiment, the shape of the metal member 55 is arbitrarily changed in accordance with the configurations of the light modulation devices 4R, 4G, and 4B and the condition of being housed inside the exterior housing 600 of the projector, and is not limited to the shape illustrated in FIG. 3 and FIG. 4. The shape of the opposed area 500 is not limited to the frame shape, and can be changed to an arbitrary shape including, for example, a plurality of rectangular shapes in accordance with the shapes of the metal member 55 and the cross dichroic prism 420.

In the projector 1 according to the first embodiment, or the projectors according to the second embodiment and the third embodiment, a relative arrangement between the adhesive layer 510 and the air layer 520 in the opposed area 500 is not limited to the arrangement in which the layers are zoned in the circumferential direction of the opposed area 500 or the inner and outer areas with respect to the center of the opposed area 500, and is not required to have regularity, and can arbitrarily be modified.

Figure 18:
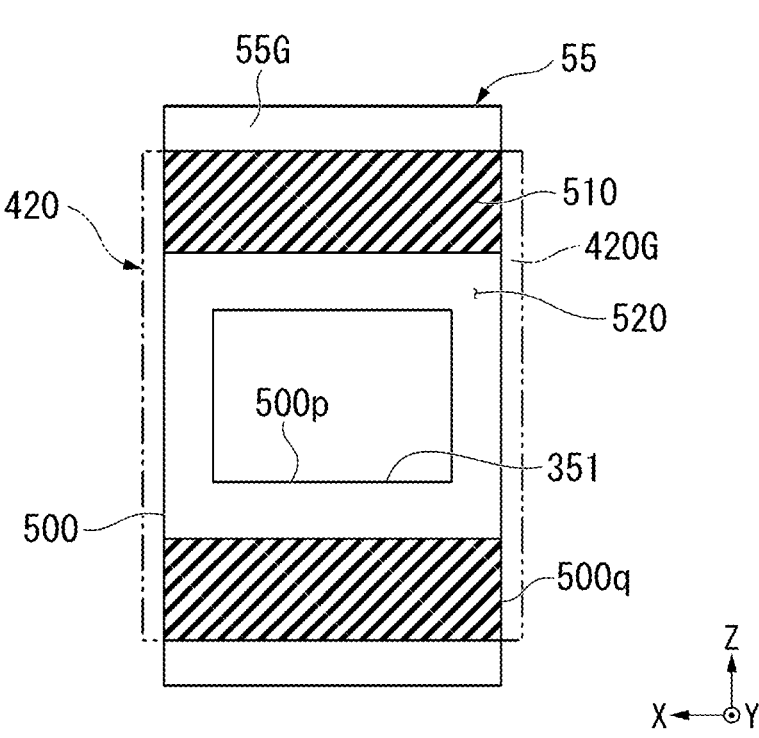
FIG. 18 is a front view of an image-forming device according to a third modified example of a projector according to the present disclosure.

FIG. 18 is a diagram for explaining a third modified example of the bonding state between the metal member 55 of the light modulation device 4G and the cross dichroic prism 420 in the image-forming device 400 viewed from the Y direction. As shown in FIG. 18, it is possible for the adhesive layer 510 to be disposed in, for example, a front-end area and a rear-end area in the Z direction of the opposed area 500. Also in the configuration of the third modified example, the proportion P is decided in substantially the same manner as in the proportion P described with respect to the projector 1 according to the first embodiment. According to the configuration of the third modified example, it is possible to reduce the EMI noise N transmitted from the metal member 55 to the cross dichroic prism 420 to reduce the amount of the EMI noise emitted to the outside of the projector similarly to the projector 1 of the first embodiment. In addition, according to the configuration of the third modified example, out of the opposed area 500, the adhesive layers 510 are each arranged in an area at an outer side of an area in which a width between the inner circumferential edge 500p and the outer circumferential edge 500q is relatively large. This can prevent infiltration of the adhesive to the area where the width between the inner circumferential edge 500p and the outer circumferential edge 500q is relatively small, and the leakage thereof to the opening 351.

In the configuration of the third modified example, as described in the third embodiment, it is possible to form the recessed part 530 on any one of the side surfaces 55R, 55G, and 55B of the metal members 55 and the side surfaces 420R, 420G, and 420B of the cross dichroic prism 420 in the area 503 where the air layer 520 is disposed.

It should be noted that in the opposed area of the projector according to the present disclosure, by arranging a substance or a medium having permittivity lower than the permittivity of the prism and the adhesive in at least the area where the air layer is disposed, it is possible to reduce the amount of the propagation of the EMI noise from the first metal member to the prism, and the amount of the EMI noise to be emitted to the outside of the projector.

A projector according to an aspect of the present disclosure may have the following configuration.

The projector according to an aspect of the present disclosure includes a first light modulation device configured to emit a first image light beam, a second light modulation device configured to emit a second image light beam, a prism configured to combine the first image light beam and the second image light beam with each other, a first metal member configured to couple the first light modulation device and the prism to each other, a lens configured to project a light beam combined by the prism, a second metal member configured to support the lens, and a third metal member configured to couple the prism and the second metal member to each other, wherein an air layer is disposed in an opposed area where the first metal member and the prism are opposed to each other.

In the projector according to the aspect of the present disclosure, the opposed area may have a frame shape surrounding an opening of the first light modulation device through which the first image light beam passes, and an adhesive layer configured to bond the first metal member and the prism to each other and the air layer may be disposed in the opposed area so as to be adjacent to each other in a direction along a circumferential edge of the opening.

In the projector according to the aspect of the present disclosure, the opposed area may have a frame shape surrounding an opening of the first light modulation device through which the first image light beam passes, and out of the opposed area, an adhesive layer configured to bond the first metal member and the prism to each other may be disposed in an area at an outer side of an area where the air layer is disposed with respect to the opening.

In the projector according to the aspect of the present disclosure, a recessed part may be provided to at least one of the first metal member and the prism opposed to each other across the air layer.

What is claimed is:

1. A projector comprising:
   a first light modulator configured to emit first image light beam;
   a second light modulator configured to emit second image light beam;
   a prism configured to combine the first image light beam and the second image light beam with each other;
   a first metal member configured to couple the first light modulator and the prism to each other and the first metal member has an opening through which the first light beam passes;
   a lens configured to project light beam combined by the prism;
   a second metal member configured to support the lens;
   a third metal member configured to couple the prism and the second metal member to each other;
   an adhesive layer configured to bond the first metal member and prism to each other disposed in a facing area where the first metal member and the prism face each other; wherein
      the facing area has a frame shape surrounding the opening when viewed along a facing direction in which the first metal member and prism face each other; and
   an air layer disposed in the facing area, wherein the adhesive layer and the air layer are disposed adjacent to each other in a direction along a circumferential edge of the opening, wherein the adhesive layer and air layer each include multiple regions arranged alongside each other, and wherein a proportion of the adhesive layer to the air layer between the prism and first metal member is in a range of 73% to 90%.

2. The projector according to claim 1, wherein a recessed part is provided to at least one of the first metal member and the prism which face each other via the air layer.

3. The projector according to claim 1, wherein the air layer comprises a permittivity of about 1.0 [F·m$^{-1}$].

4. The projector according to claim 1, wherein a permittivity of the prism is in a range of about 3.7 [F·m$^{-1}$] to about 10.0 [F·m$^{-1}$].

5. The projector according to claim 1, wherein a permittivity of the prism is in a range of about 8.0 [F·m$^{-1}$] to about 10.0 [F·m$^{-1}$].

6. The projector according to claim 1, wherein a permittivity of the adhesive layer is about 5.0 [F·m$^{-1}$].

7. The projector according to claim 1, wherein a thickness of the adhesive layer is about 1 mm.

\* \* \* \* \*